(12) United States Patent
Tenmyo

(10) Patent No.: US 7,422,353 B2
(45) Date of Patent: Sep. 9, 2008

(54) LIGHT-EMITTING DEVICE FOR IMAGE TAKING AND IMAGE-TAKING APPARATUS HAVING SAME

(75) Inventor: Yoshiharu Tenmyo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 11/365,696

(22) Filed: Mar. 1, 2006

(65) Prior Publication Data

US 2006/0209524 A1 Sep. 21, 2006

(30) Foreign Application Priority Data

Mar. 17, 2005 (JP) ............................. 2005-078094

(51) Int. Cl.
*F21V 7/04* (2006.01)
(52) U.S. Cl. .................. 362/551; 362/602; 362/616; 362/626; 362/628; 362/331; 362/339; 362/11; 362/16; 362/17; 385/146; 396/199; 396/267
(58) Field of Classification Search ................ 362/110, 362/16, 551, 602, 628, 7, 3, 11, 12, 17, 23, 362/26, 27, 511, 620, 616, 613, 626, 339, 362/331, 326, 330, 244–246; 396/198, 199, 396/14, 16, 182, 267; 385/146, 133, 36, 385/900–902
See application file for complete search history.

(56) References Cited

U.S. PATENT DOCUMENTS

| | | | | |
|---|---|---|---|---|
| 3,474,242 A | * | 10/1969 | Forrant | 362/7 |
| 6,860,613 B2 | * | 3/2005 | Miyashita | 362/620 |
| 7,127,163 B2 | * | 10/2006 | Lee et al. | 396/198 |
| 2002/0018350 A1 | * | 2/2002 | Lepley et al. | 362/551 |
| 2002/0154511 A1 | * | 10/2002 | Verlage et al. | 362/487 |
| 2004/0096182 A1 | * | 5/2004 | Yamashita et al. | 385/146 |
| 2004/0202003 A1 | * | 10/2004 | Lyst, Jr. | 362/511 |
| 2004/0207993 A1 | * | 10/2004 | Aynie et al. | 362/23 |
| 2006/0083508 A1 | * | 4/2006 | Tenmyo | 396/199 |

FOREIGN PATENT DOCUMENTS

| | | |
|---|---|---|
| JP | 2000-314908 | 11/2000 |
| JP | 2001-255574 | 9/2001 |
| JP | 2004-023412 | 1/2004 |

* cited by examiner

*Primary Examiner*—Jong-Suk (James) Lee
*Assistant Examiner*—Kevin J. Spinella
(74) *Attorney, Agent, or Firm*—Cowan, Liebowitz & Latman, P.C.

(57) ABSTRACT

A light-emitting device is disclosed which enables efficient use of luminous flux and achieves a desired light emission characteristic. The light-emitting device has an optical member which has an emergence surface and a plurality of optical portions, each of the optical portions including a first surface which directs light incident thereon to the emergence surface. The plurality of first surfaces are inclined on the same side with respect to the emergence surface. The light-emitting device also has a light guiding member which directs light from a light source to the plurality of optical portions from one side of a direction in which the plurality of optical portions are arranged.

6 Claims, 30 Drawing Sheets

LIGHT-EMITTING DEVICE FOR IMAGE TAKING AND IMAGE-TAKING APPARATUS HAVING SAME

BACKGROUND OF THE INVENTION

The present invention relates a light-emitting device for use in various apparatuses such as image-taking apparatuses including a digital still camera and a video camera, and camera-equipped cellular phones.

Some of image-taking apparatuses such as a video camera and a digital still camera have a capability to take an image of an object (or subject) at an extremely close range from an image-taking lens (a macro photography capability).

In such macro photography, the use of a typical illumination apparatus (a light-emitting device) provided for a camera, for example at an upper portion thereof, causes disadvantages such as a failure to illuminate uniformly a necessary irradiation area resulting from part of the illumination light being blocked by a lens barrel, and an unnatural image including a dark shadow on one side of an object.

Thus, an illumination apparatus has been proposed in which a ring-shaped light emergence portion or a plurality of light emergence portions are disposed around the end of a lens barrel to allow illumination suitable for the macro photography (see Japanese Patent Laid-Open No. 2004-23412 or Japanese Patent Laid-Open No. 2000-314908).

Japanese Patent Laid-Open No. 2004-23412 has proposed an illumination apparatus in which light emitting from a flash unit for normal image-taking is directed to the periphery of a lens barrel by using a number of optical fibers. Japanese Patent Laid-Open No. 2000-314908 has proposed an external illumination apparatus which has a ring-shaped portion which is disposed on the outer periphery of a lens barrel to direct illumination light from a light source in the circumferential direction of the ring-shaped portion before emergence.

In recent years, small apparatuses including a camera-equipped cellular phone often employ a light-emitting device which is used as a substitute for a flashlight and performs display by lighting or blinking of light or changing colors of light as a means for showing a user the status of the apparatus as well as having the function of illuminating an object.

Japanese Patent Laid-Open No. 2001-255574 has made a proposal in which a light-emitting device formed of a plurality of LEDs is disposed around an image-taking lens contained in a cellular phone such that the light-emitting device illuminates an object in taking an image and the light-emitting device is blinked in response to an incoming call on the cellular phone.

In the illumination apparatus proposed in Japanese Patent Laid-Open No. 2004-23412, however, the use of a number of generally expensive optical fibers increases the cost of the illumination apparatus or the like, or no optical member provided for controlling light emerging from the optical fibers makes it impossible to achieve a desired light distribution characteristic.

In the illumination apparatus proposed in Japanese Patent Laid-Open No. 2000-314908, considering the way of directing luminous flux from the light source to the ring-shaped portion and the shape of the ring-shaped portion described in an embodiment thereof, it is likely that the efficiency of use of the light from the light source is reduced or a desired light distribution characteristic is not realized in reality.

On the other hand, in the cellular phone proposed in Japanese Patent Laid-Open NO. 2001-255574, a plurality of light sources are provided but the luminous fluxes therefrom do not emerge through a single (common) optical system. In other words, an optical system is provided for each of the light sources, so that a number of parts are required for illumination and display to need large space and the resulting cellular phone is inevitably expensive.

BRIEF SUMMARY OF THE INVENTION

It is an object of the present invention to provide a light-emitting device which enables efficient use of luminous flux from a light source with a simple and inexpensive structure and achieves a desired light emission characteristic (for example, a light distribution characteristic).

It is another object of the present invention to provide a light-emitting device which enables efficient use of luminous flux from a plurality of light sources with a simple and inexpensive structure, achieves a desired light emission characteristic (for example, a light distribution characteristic), and allows an additional use as an illumination means or a display means.

According to an aspect, the present invention provides a light-emitting device having an optical member which has an emergence surface and a plurality of optical portions, each of the optical portions including a first surface which directs light incident thereon to the emergence surface, and the plurality of first surfaces being inclined on the same side with respect to the emergence surface. The light-emitting device also has a light guiding member which directs light from a light source to the plurality of optical portions from one side of a direction in which the plurality of optical portions are arranged.

According to another aspect, the present invention provides a light-emitting device having an optical member which has an entrance surface which receives light from a first light source, an emergence surface, and a plurality of optical portions which reflect light from the entrance surface to the emergence surface, and a light guiding member which directs light from a second light source to the plurality of optical portions. The plurality of optical portions direct light incident thereon from the light guiding member to the emergence surface.

An image-taking apparatus on which the light-emitting device is removably mounted or an image-taking apparatus which includes the light-emitting device integrally therewith provides another aspect of the present invention.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

FIGS. 1 to 9 show a ring light adapter for macro photography serving as a light-emitting device which is Embodiment 1 of the present invention. In Embodiment 1, the ring light adapter is removably mounted around an image-taking lens barrel in an image-taking apparatus such as a video camera.

Figure 1:
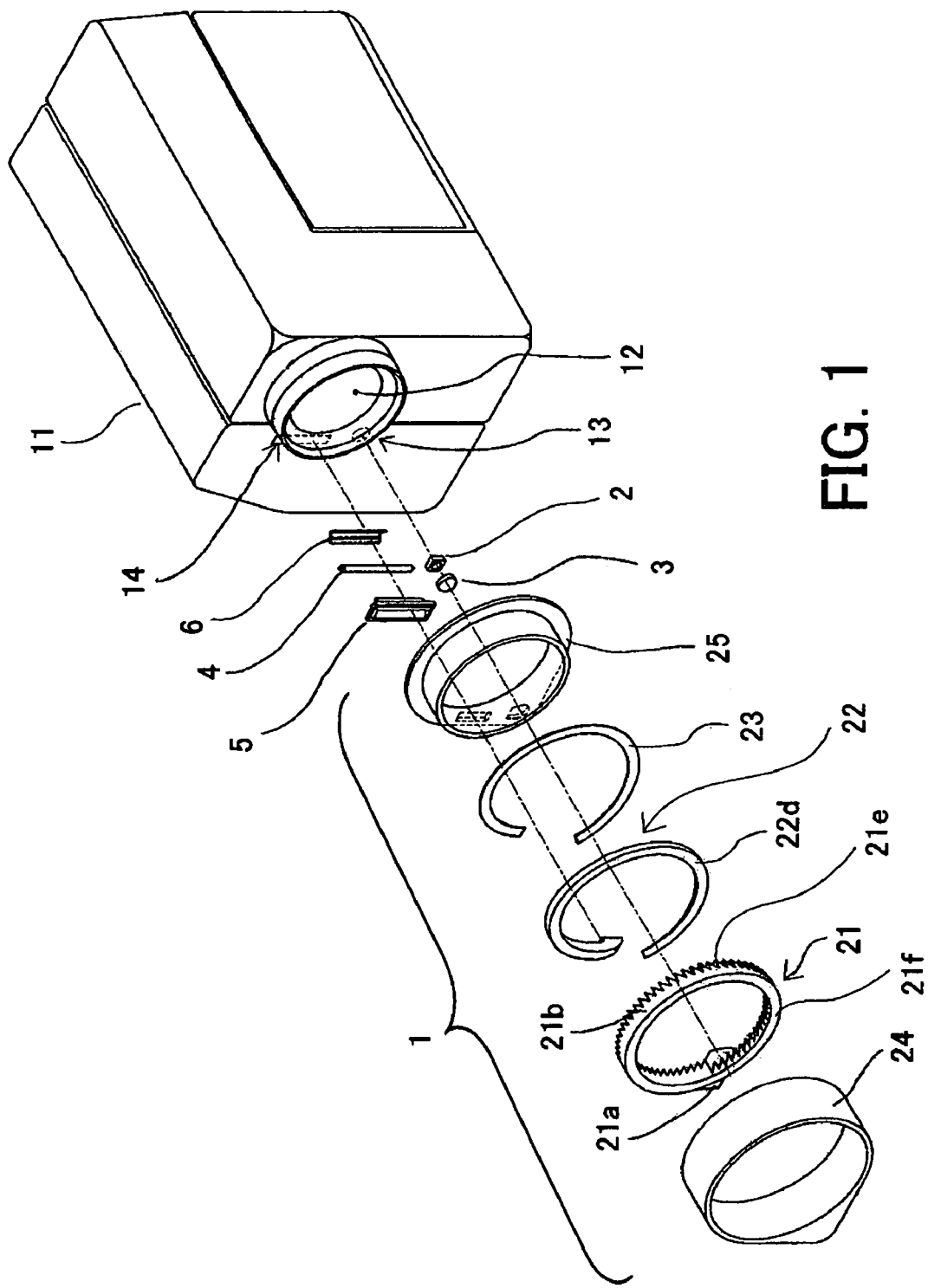
FIG. 1 is a perspective view showing a main optical system of a ring light adapter for macro photography which is Embodiment 1 of the present invention.
Figure 2:
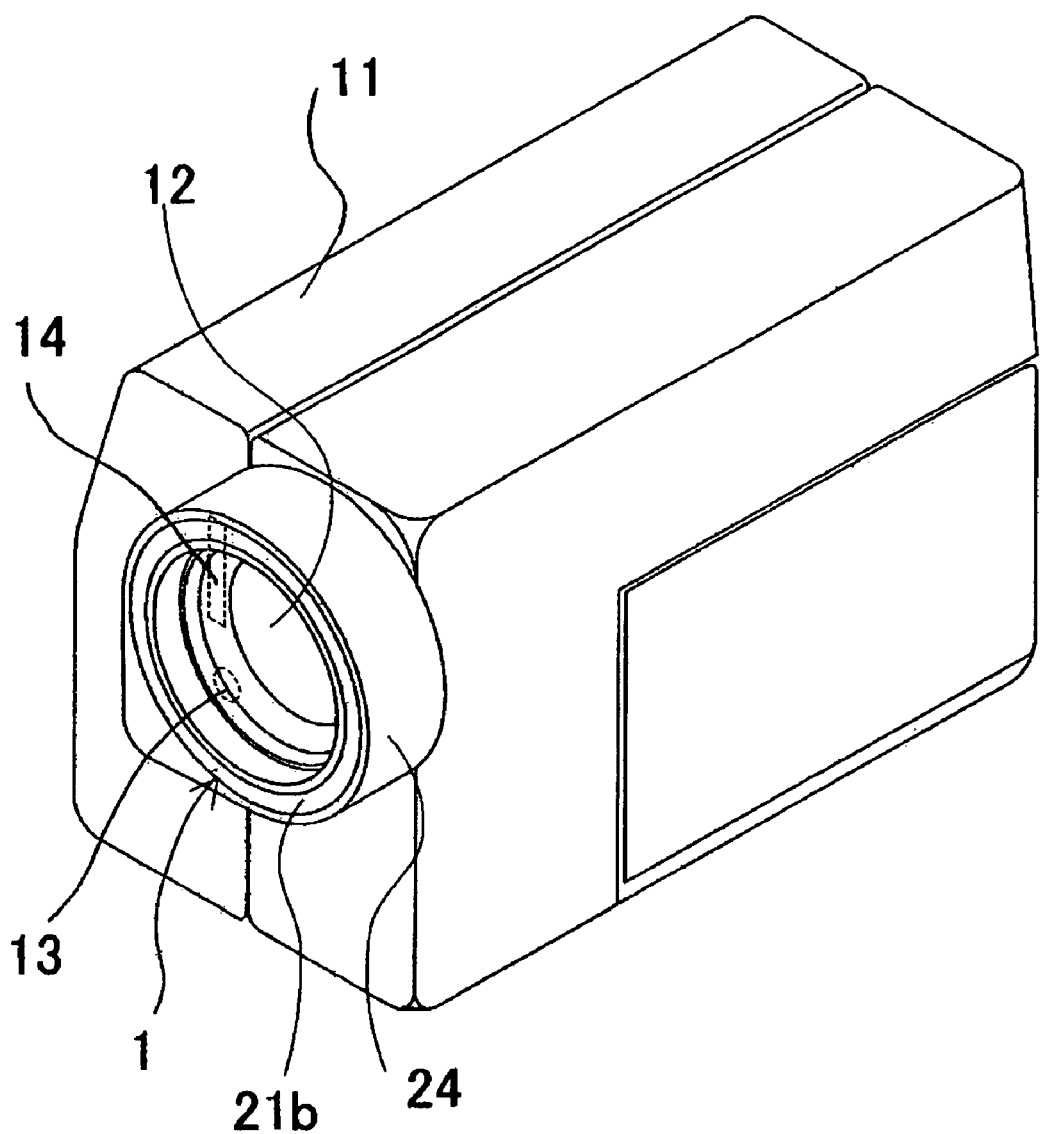
FIG. 2 is a perspective view of a video camera on which the ring light adapter for macro photography of Embodiment 1 is mounted.
Figure 3:
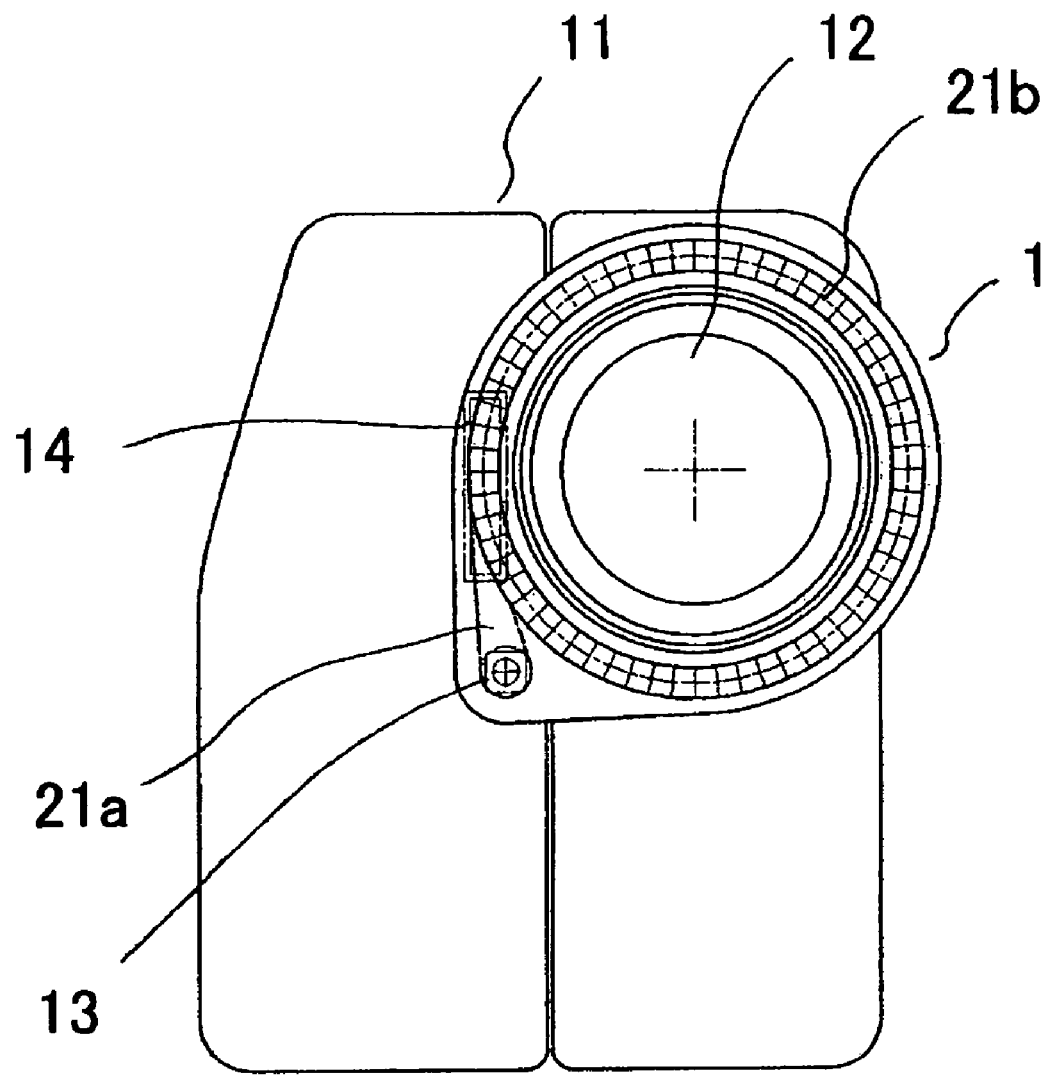
FIG. 3 is a front view of the video camera on which the ring light adapter for macro photography of Embodiment 1 is mounted.
Figure 4:
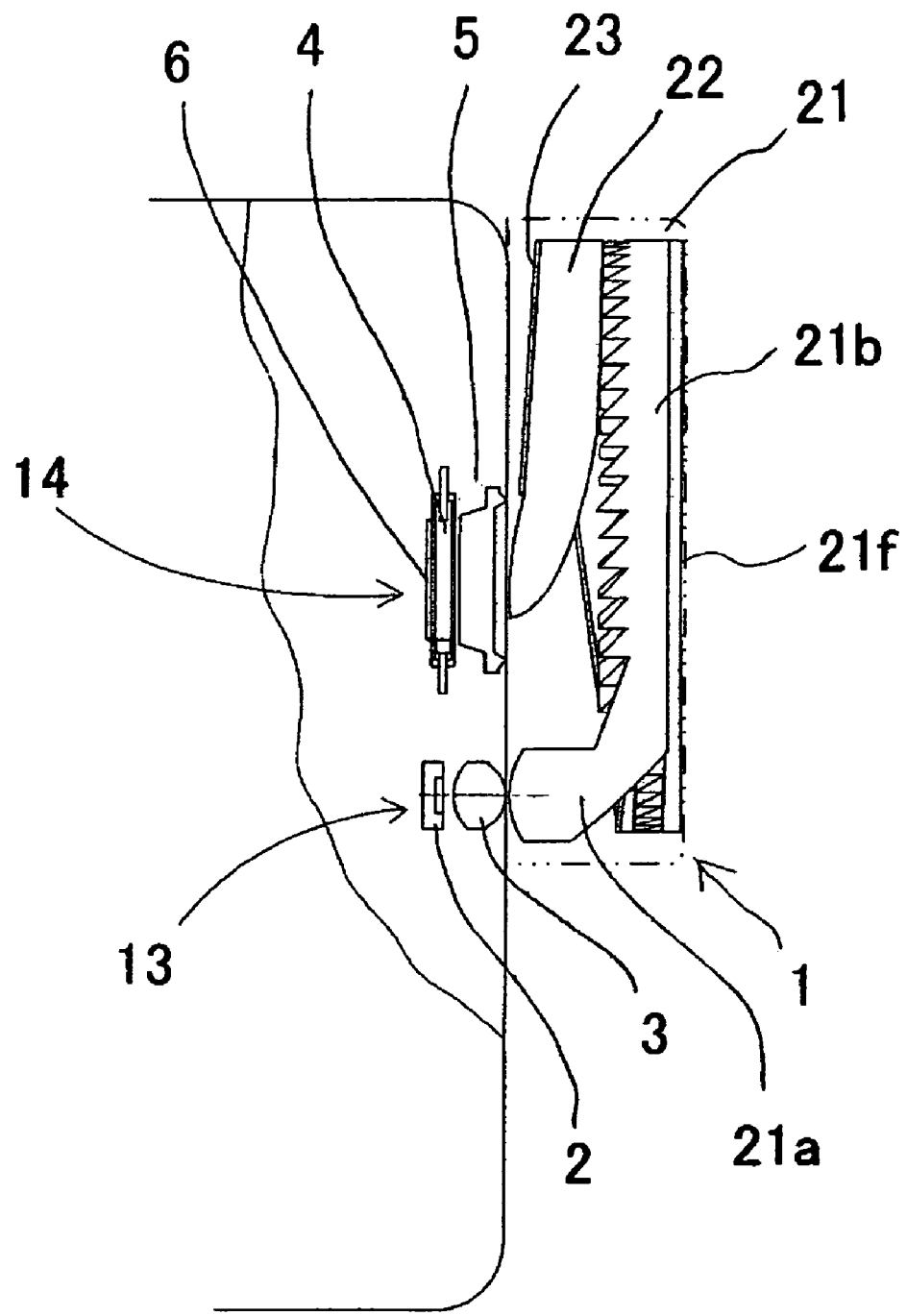
FIG. 4 is a partial section view showing the video camera on which the ring light adapter for macro photography of Embodiment 1 is mounted.

FIG. 1 is a perspective view showing a main optical system of the ring light adapter (hereinafter referred to as a ring light optical system). FIG. 2 is a perspective view showing the video camera on which the ring light adapter is mounted. FIG. 3 is a front view of the video camera. FIG. 4 is a partial section view showing the video camera.

As shown in FIGS. 1 and 2, a light emitter 13 and a light emitter 14 each for emitting light which is to enter the ring light adapter of Embodiment 1 are disposed close to an image-taking lens barrel 12 in a video camera body 11.

In FIGS. 1 and 2, reference numeral 1 shows the ring light adapter. The video camera body 11 has the image-taking lens barrel 12, the LED light emitter 13 formed of an LED 2 serving as a light source and a condenser lens 3 for condensing luminous flux emitted from the LED 2, and the flashlight emitter 14 formed of a xenon light-emitting discharge tube (hereinafter referred to as an arc tube) 4 serving as a light source, a condenser prism 5 for condensing luminous flux emitted from the arc tube 4, and a reflecting member 6 for reflecting light emitted backward (toward an image plane) from the arc tube 4 toward the front (toward an object). The LED 2 is realized by a high-luminance white LED which can emit uniform luminous flux which is fixed light for taking moving images or display, that is, light having a substantially constant amount during a time period longer than that of flashlight. The arc tube 4 can emit flashlight (also referred to as a spark of light or instantaneous light) for taking still images. Each of the condenser lens 3 and the condenser prism 5 is made of an optical resin material with high transparency.

Next, description will be made of components which provide optical characteristics of the ring light optical system. In FIG. 1, reference numeral 21 shows an optical member which changes luminous flux emitted from the LED 2 into ring-shaped luminous flux and is made of a resin material which passes light, for example, an optical resin material with high transmittance such as acrylic resin and polycarbonate resin.

A ring-shaped emergence portion (hereinafter referred to as a ring portion) 21b of the optical member 21 has an emergence surface 21f facing the front and micro prism portions 21e serving as a plurality of optical portions arranged in the circumferential direction on the side opposite to the emergence surface 21f. The ring portion 21b is formed to have a larger thickness in the optical axis direction of emergence closer to the light source and a smaller thickness with distance from the light source in the traveling direction of luminous flux.

Reference numeral 22 shows a light guiding member which directs luminous flux emitted from the arc tube 4 toward an edge surface (hereinafter referred to as a prism edge surface) of each of the micro prism portions 21e of the optical member 21 from one side of the arrangement of the plurality of micro prism portions 21e. The light guiding member 22 is also formed to have a smaller thickness in the optical axis direction of emergence with distance from the light source in the traveling direction of the luminous flux. The light guiding member 22 is disposed to extend along the tips (the rear ends) of the plurality of the micro prism portions 21e in the optical member 21.

Reference numeral 23 shows a reflecting member which is disposed at the back of and close to the light guiding member 22 almost all around the rear surface of the light guiding member 22. The reflecting member 23 has a function of reflecting luminous flux reflected backward from the light guiding member 22 back toward the light guiding member 22 and is made of a highly reflective material with high reflectivity at least on its surface (the front surface) facing the light guiding member 22.

Reference numerals 24 and 25 show holding members for holding the optical member 21, the light guiding member 22, and the reflecting member 23. Specifically, reference numeral 24 shows the first holding member which is disposed closer to the emergence surface, and 25 the second holding member which includes openings for receiving luminous flux emerging from the condenser lens 3 and the condenser prism 5.

As shown in FIGS. 3 and 4, the optical member 21 is generally formed of the ring portion 21b and a light guiding portion 21a. The light guiding portion 21a has an entrance surface 21c which receives luminous flux gathered by the condenser lens 3. The light guiding portion 21a changes the direction of the entering luminous flux from the entrance surface 21c and is connected to the ring portion 21b to direct the luminous flux in the changed direction to the ring portion 21b. The ring portion 21b changes the direction of the entering luminous flux through the light guiding portion 21a into a direction substantially parallel with the optical axis of the image-taking lens 12 and changes the luminous flux to emerge in ring shape.

FIG. 3 shows the positional relationship between the ring light optical system and the two light sources provided for the video camera body. The opening for the LED light emitter 13 which emits fixed light is spaced diagonally from the image-taking lens barrel 12 at a lower portion thereof. The opening for the flashlight emitter 14 which emits flashlight is disposed immediately at the side of the image-taking lens barrel 12 at a position behind the ring portion 21b.

Generally, when luminous flux is caused to enter the ring-shaped optical member, the entrance of the light in the direction of a tangent to the ring-shaped optical member can prevent the luminous flux which entered the optical member from escaping therefrom, so that the luminous flux can be taken in relatively efficiently. However, when the light source is totally covered by the ring-shaped optical member as in Embodiment 1, the luminous flux from the light source cannot enter the optical member 21 in the direction of the tangent to the optical member as described above.

Embodiment 1 is advantageous in allowing the optical member to function efficiently even when the light source is positioned behind the ring-shaped optical member. In other words, Embodiment 1 has a number of advantageous such as increased flexibility in the position of the light source, and the possibility of disposing a plurality of light sources side by side, as shown in Embodiment 4 and 5, later described.

In the abovementioned structure, when an image-taking mode is set to a super night mode (a mode of illumination using a high-luminance LED in dark environments with poor outside light and fill light required) in the video camera body 11, the device performs illumination necessary for an object. This mode typically assumes a camera-to-object distance of 50 cm or longer, and the mode does not require the macro photography ring light adapter.

Many of video cameras are capable of macro photography. For example, not a few video cameras can take images at a close range up to approximately 1 cm. However, a number of problems occur when images are taken at such a close range with illumination of light from a typical light source which can be regarded as almost one point.

Specifically, the illumination light is applied only to one side of an object to cause a deep shadow on the other side of the object. In addition, the image-taking lens barrel interferes with the illumination light to darken part of the image extremely.

In contrast, the ring light adapter of Embodiment 1 has the purposes of performing uniform illumination on an object and preventing the interference by the lens barrel, and thus allows illumination light from the given almost one point to emerge from a large emergence surface close to a surface light source and enables ideal illumination without any unnatural shadow by the emergence surface provided over the entire circumference of the barrel.

In recent years, many of video cameras have a function of taking still images and include a flash optical system which realizes instantaneous high-luminance light emission for image-taking in the dark as shown in Embodiment 1. The flashlight also has the problems as described above and the flash optical system is not necessarily an ideal light source in performing macro photography.

The ring light adapter of Embodiment 1 employs the optical member to change the fixed light from the LED light source into the ring-shaped light suitable for the macro photography and utilizes the same optical member to change the flashlight into the ring-shaped light. In other words, the ring light adapter can be used to apply illumination light having substantially uniform distribution of light amount over substantially the entire circumference of the common (same) optical member (the ring portion 21b) for the plurality of light sources.

Figure 5:
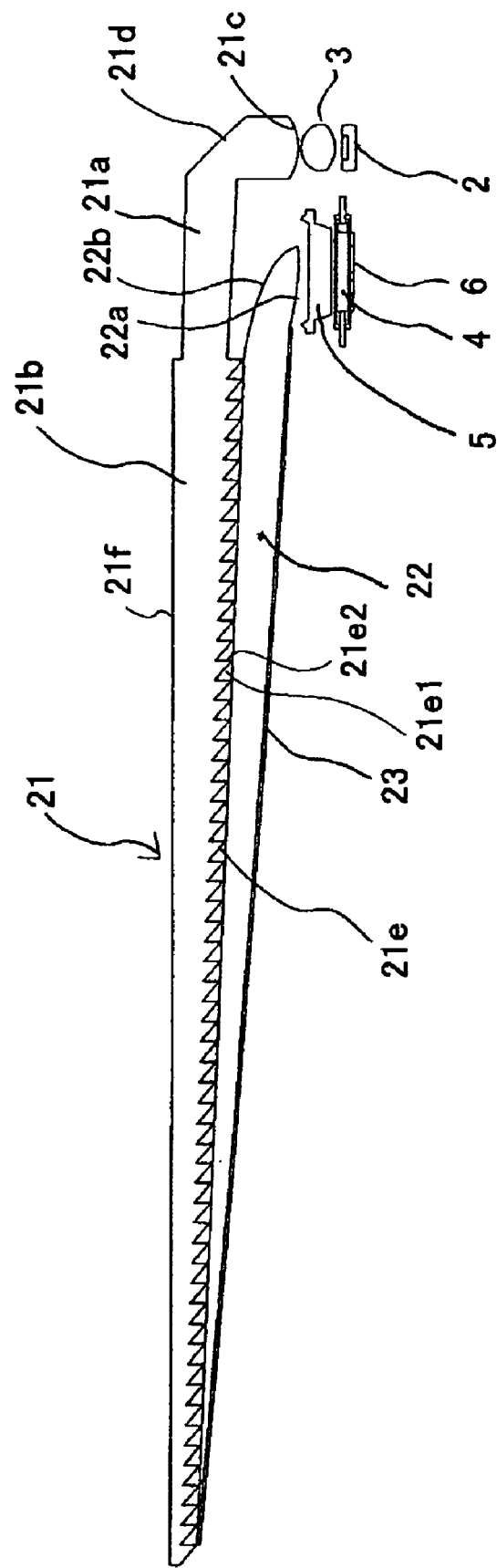
FIG. 5 is a section view showing a ring portion developed in the circumferential direction in the ring light adapter for macro photography of Embodiment 1.
Figure 6:
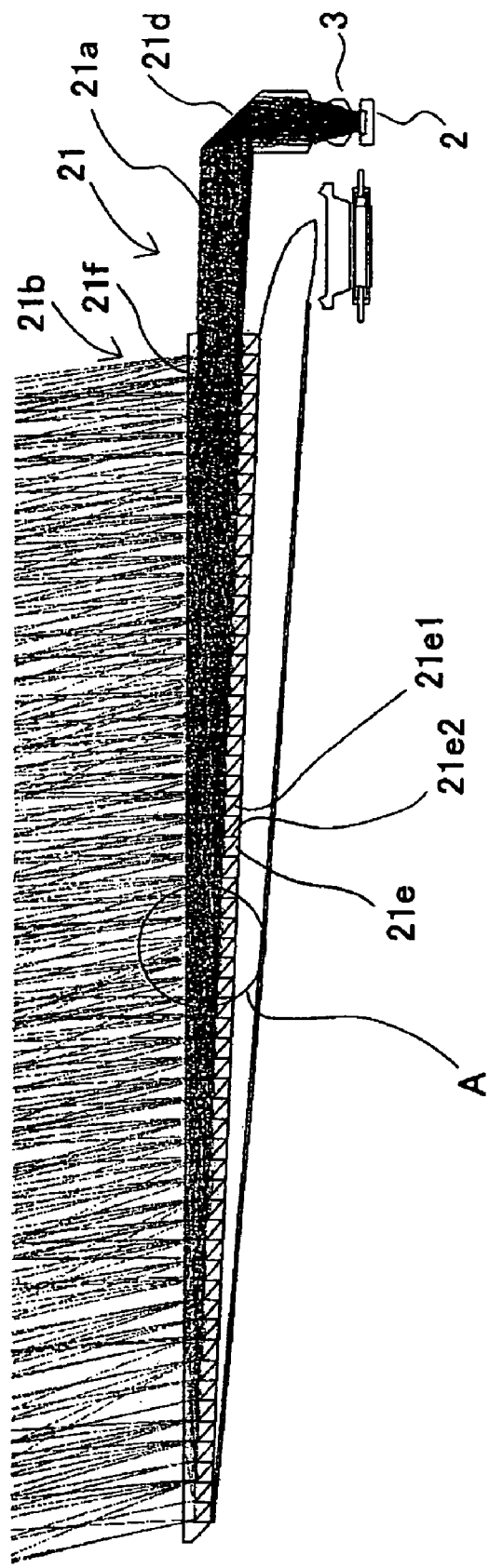
FIG. 6 shows a light ray tracing diagram added to FIG. 5.
Figure 7:
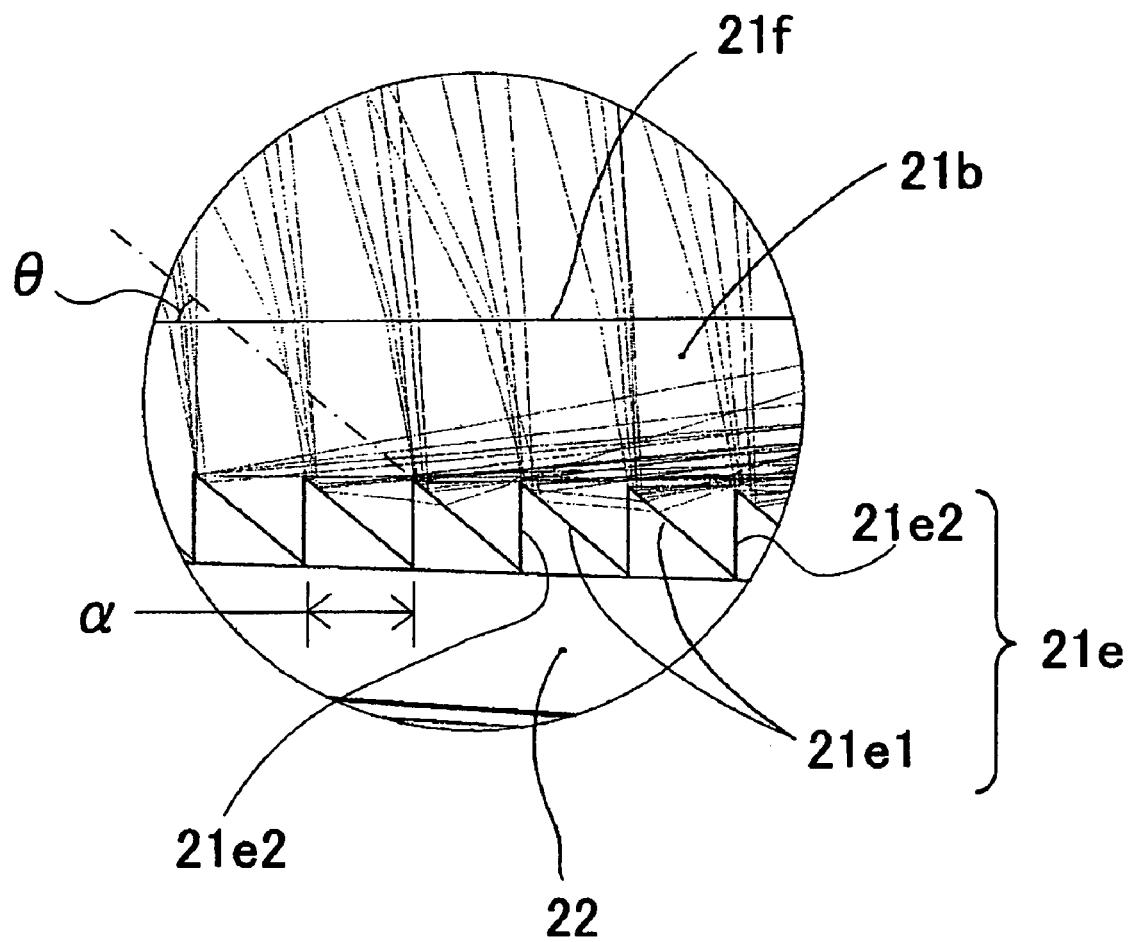
FIG. 7 is an enlarged view of part of FIG. 6.
Figure 8:
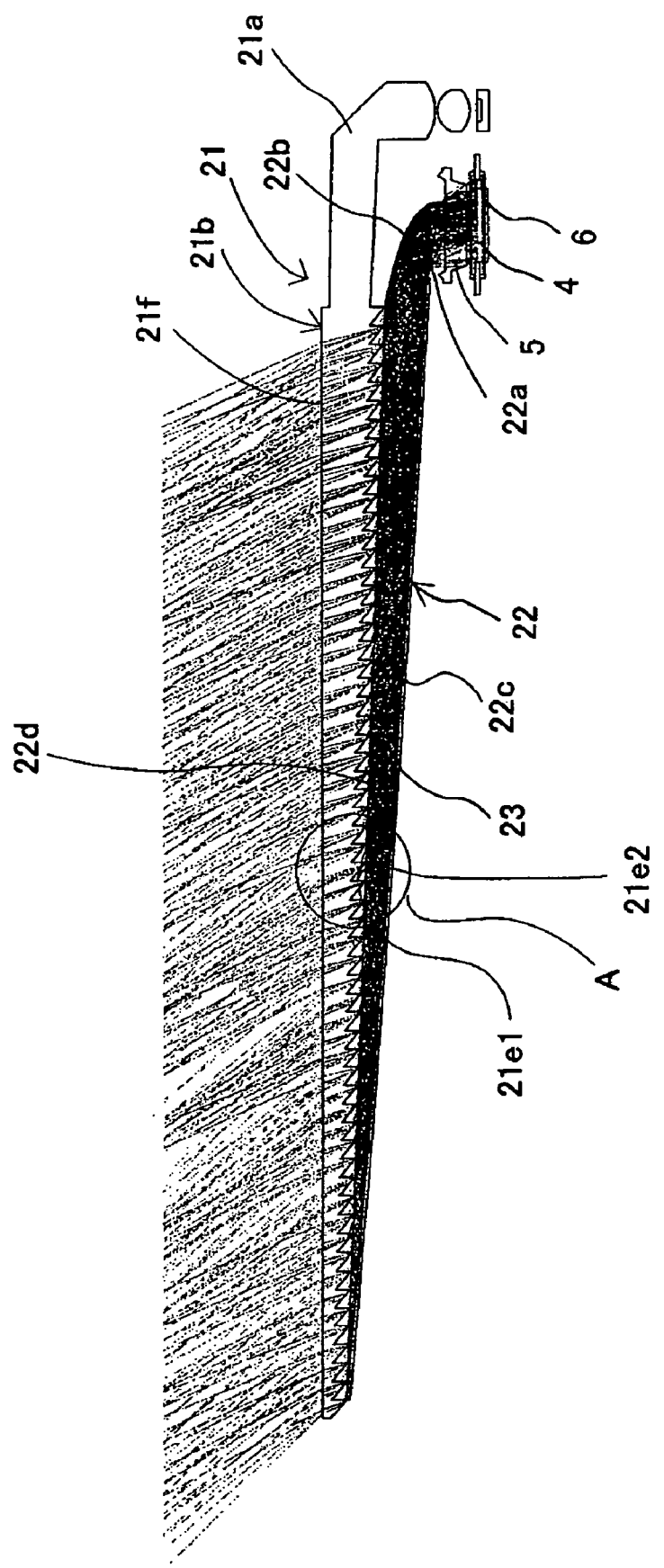
FIG. 8 shows a light ray tracing diagram added to FIG. 5.
Figure 9:
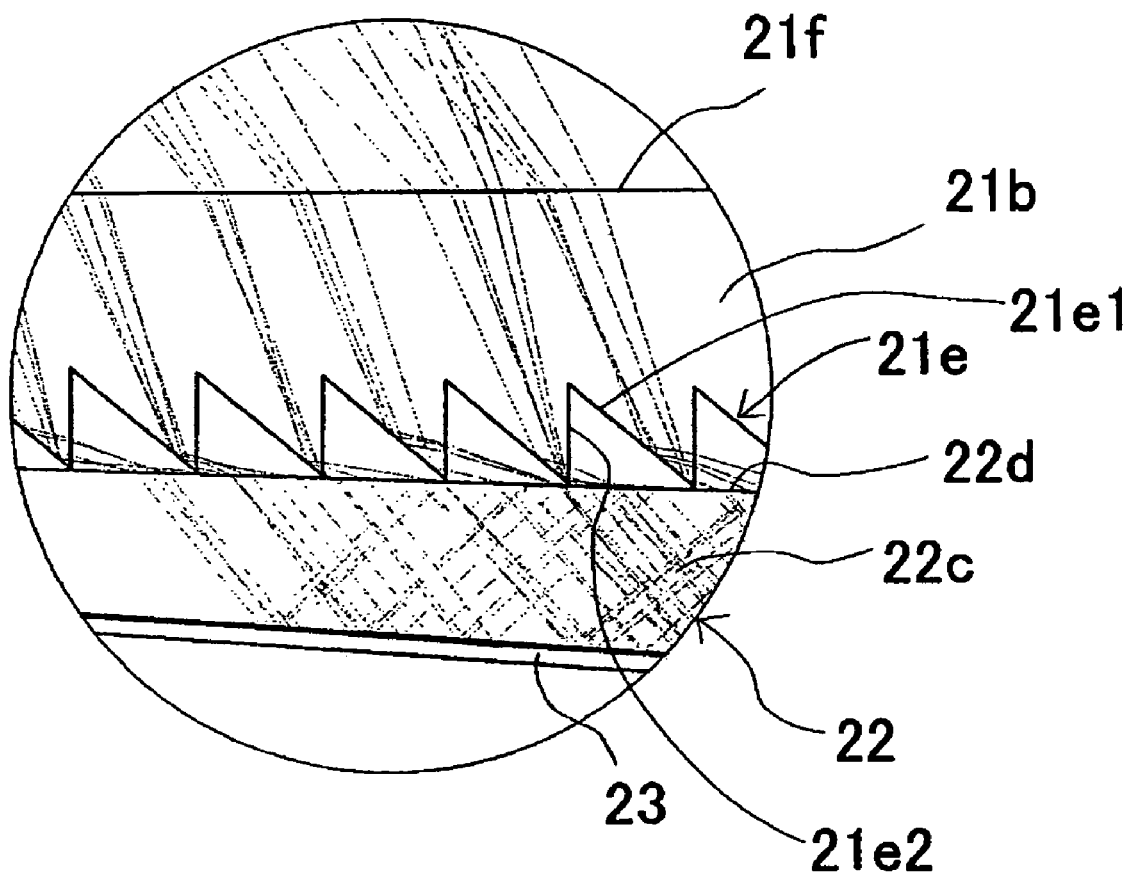
FIG. 9 is an enlarged view of part of FIG. 8.

Description will hereinafter be made of the detailed shape of the ring light optical system in Embodiment 1. FIG. 5 is a section view showing the ring light optical system developed. FIGS. 6 and 8 show a light ray tracing diagram added to the ring light optical system shown in FIG. 5. FIGS. 7 and 9 are enlarged views of part of the light ray tracing diagram (a portion A) in FIGS. 6 and 8.

As shown in FIGS. 5 and 6, luminous flux emitted from the LED 2 is gathered to a certain irradiation angle range by the condenser lens 3 disposed in front thereof. The irradiation angle range is adjusted by the shape of the condenser lens 3 and the distance between the LED 2 and the condenser lens 3 to satisfy an irradiation angle range necessary for a typical camera-to-object distance (for example, 50 cm or longer) of a video camera. The light guiding portion 21a of the optical member 21 changes the direction of the luminous flux emerging from the condenser lens 3 and gathers the luminous flux to a certain range.

The entrance surface 21c of the light guiding portion 21a is somewhat larger than the aperture of the condenser lens 3 and is disposed opposite and close to the condenser lens 3 attached to the video camera body 11. This is provided for taking the luminous flux emerging from the condenser lens 3 as much as possible and this structure can make the most of the light amount emitted from the light source.

The direction of the entering luminous flux from the entrance surface 21c is changed approximately 90 degrees such that it can be efficiently directed to the ring portion 21b to which the light guiding portion 21a is connected. The direction change is not performed by using a reflecting surface realized by a metal-evaporated surface with high reflectivity which is widely used as a reflecting surface, but is basically performed entirely by using total reflection. The total reflection is a phenomenon in which a component of luminous flux traveling from a medium with a high refractive index to a medium with a low refractive index that has an angle larger than a critical angle at the boundary between them is reflected with a refractivity of 100%. An optical system which makes good use of the total reflection can provide high efficiency.

In Embodiment 1, a total reflection surface 21d made as a continuous aspheric surface is formed in the light guiding portion 21a to change the direction efficiently as shown in the light ray tracing diagram of FIG. 6. The elements of the optical system after the total reflection surface 21d are also based on the use of the total reflection to direct the luminous flux. This can direct the luminous flux at lower cost with higher efficiency as compared with the use of the typical reflecting surface realized by a metal-evaporated surface. However, all the luminous flux may not be reflected through the total reflection depending on the condensing degree of the luminous flux or the refractive index of the optical member, so that it is possible to reduce loss of the luminous flux by disposing another reflecting surface outside and close to the total reflection surface 21d or performing metal evaporation on part of the total reflection surface 21d.

Next, description will hereinafter be made of how the light guiding portion 21a is connected to the ring portion 21b and the structure for changing the luminous flux reaching the ring portion 21b into luminous flux in a direction substantially parallel with the optical axis of the image-taking lens (toward the object) with reference to FIGS. 6 and 7.

As shown in FIG. 3, the light guiding portion 21a is connected to the ring portion 21b only on one side. The light guiding portion 21a is in contact with the ring potion 21b. The connection of the light guiding portion 21a to the ring portion 21b in this manner can direct the luminous flux entering the ring portion 21b in the circumferential direction efficiently. The luminous flux entering the ring portion 21b travels clockwise in FIG. 3.

In Embodiment 1, to redirect the luminous flux traveling in a loop within the ring portion 21b toward the object, the plurality of micro prism portions 21e are continuously arranged in the circumferential direction at the position opposite to the emergence surface 21f of the ring portion 21b.

Embodiment 1 shows the case where each of the macro prism portions 21e has a reflecting surface set at an angle of approximately 40 degrees with respect to the emergence surface 21f.

FIG. 6 shows the optical path in the ring portion 21b developed in the circumferential direction, through which the luminous flux is directed to the ring portion 21b from the LED 2 and travels before emergence from the emergence surface 21f of the optical member 21. FIG. 7 is an enlarged view of part of the ring portion 21b.

Each of the micro prism portions 21e has a total reflection surface (a first surface, hereinafter referred to as a prism reflecting surface) 21e1 inclined in the circumferential direction (that is, the direction in which the plurality of micro prism portions are arranged) with respect to the emergence surface 21f such that only the component of the luminous flux entering from the light guiding portion 21a that travels in a certain angle range is reflected toward the emergence surface 21f. The plurality of micro prism portions 21e as described above are continuously formed in the circumferential direction of the ring portion 21b. All the prism reflecting surfaces 21e1 are formed to be inclined on the same side to the emergence surface 21f.

The traveling of the luminous flux directed to the ring portion 21b is regulated in one direction, and the all the prism reflecting surfaces 21e1 are inclined on the same side, thereby making it possible to reflect totally only the luminous flux component in a predetermined angle range. In addition, the remaining luminous flux can be once refracted to emerge outside the optical member 21 and again enter the optical member 21 from a prism edge surface 21e2 formed between the prism reflecting surface 21e1 which the luminous flux passed and the adjacent prism reflecting surface 21e1 in the traveling direction.

Conventionally, in the typical illumination optical system called a surface light emitting type, the surface of an optical member opposite to an emergence surface is formed as a diffusing surface realized by a white color dot print pattern or the like. The luminous flux diffused as required by the diffusing surface and emerging from the optical member is reflected by a reflecting plate and caused to emerge from the emergence surface. The luminous flux is once subjected to diffusion for the direction change in this manner, resulting in significant loss of light amount.

In Embodiment 1, since the direction of the luminous flux is changed by the total reflection effect of the optical member 21 (the prism reflecting surface 21e1), the direction change is accomplished with excellent efficiency. Specifically, the luminous flux at an angle unsuitable for emergence from the emergence surface 21f is refracted by taking advantage of not satisfying the total reflection condition, while only the luminous flux satisfying the condition for emergence from the emergence surface 21f is caused to emerge. This allows the luminous flux excluded for not satisfying the condition to be used effectively with the help of the subsequent element of the optical system. Thus, the provided light energy can be effectively utilized with almost no waste. The effect of the micro prism portions 21e will be described later in detail.

As shown in FIG. 6, in Embodiment 1, the luminous flux emitted from the LED 2 is subjected to the lens effects of the condenser lens 3 disposed in front of the LED 2 and the entrance surface 21c of the optical member 21 to have an angle within a certain range in the circumferential direction of the ring portion 21b (the traveling direction of the luminous flux). Thus, only a small part of the luminous flux is not totally reflected by the total reflection surface 21d and escapes outside the optical member 21, and the luminous flux entering the ring portion 21b also has an angle within a certain range in the light traveling direction. The angle of the luminous flux falling within the certain range in this manner enables the ring portion 21b to apply light highly efficiently with a uniform light amount from the entire ring portion 21b.

The luminous flux does not travel exactly perpendicular to the emergence surface and is slightly inclined with respect to the traveling direction. The inclination of the illumination direction presents a problem in a typical illumination apparatus. In the ring light for macro photography provided by the present invention, however, the light emergence portion is ring-shaped, and when each light ray has a substantially unchanged emergence direction, they act to complement each other. Even when the optical axis of emergence is inclined to some degree, the ring can provide uniform illumination as a whole. As a result, the inclination does not cause a significant problem.

Next, the effect of the micro prism portions 21e, that is, the direction changing effect, will be described in more detail with reference to FIGS. 6 and 7.

As shown in FIG. 6, in the optical system, only a portion of the prism reflecting surface 21e1 close to the corner at the foot of the micro prism portion 21e serves as a light emergence point. More specifically, as shown in FIG. 7, all the luminous flux which is to be totally reflected by the prism reflecting surface 21e1 and to emerge from the emergence surface 21f is concentrated at the portion of the prism reflecting surface 21e near the corner at the foot of the micro prism portion 21e. The luminous flux incident on the prism reflecting surface 21e1 at an angle outside the predetermined range is once refracted by a portion of the prism reflecting surface 21e1 on the outer side (the rear side) of the corner at the foot and emerges from the prism portion 21e. Then, the luminous flux enters again the prism portion 21e from the prism edge surface 21e2 formed between the prism reflecting surface 21e1 which the luminous flux passed and the adjacent reflecting surface 21e1, and is totally reflected by the adjacent prism reflecting surface 21e1 near the corner at the foot of the prism portion 21e, followed by emergence from the emergence surface 21f.

In this manner, only the component at the predetermined angle with respect to the prism reflecting surface 21e1 is totally reflected by the portion of the prism reflecting surface 21e1 close to the corner at the foot of the prism portion 21e and emerges from the emergence surface 21f.

When the angle of the prism reflecting surface 21e1 with respect to the emergence surface 21f is approximately 40 degrees as in Embodiment 1, the luminous flux emerging from the emergence surface 21f is slightly inclined as a whole with respect to the emergence surface 21f as described above.

The luminous fluxes in and near the micro prism portions 21e travel as described above. All the luminous flux traces described are components emerging from the emergence surface 21f. In addition, the optical system of Embodiment 1 is characterized in that the luminous flux which does not satisfy the emergence condition can be used later. Specifically, the component of the luminous flux incident on the prism reflecting surface and totally reflected thereby that has an angle smaller than the critical angle with respect to the emergence surface 21f is transmitted through the emergence surface 21f for emergence. On the other hand, the component of the luminous flux totally reflected by the prism reflecting surface that has an angle larger than the critical angle with respect to the emergence surface 21f is totally reflected by the emergence surface 21f and returned toward the micro prism portions 21e.

The component of the luminous flux incident on the prism reflecting surface 21e1 that has an angle smaller than the critical angle with respect to the prism reflecting surface 21e1 is transmitted through the prism reflecting surface 21e1 and emerges outside the optical member 21. At this point, the component is refracted by the prism reflecting surface 21e1 and thus enters again the optical member 21 from the prism edge surface 21e2 present in the traveling direction of the luminous flux.

The series of the reflections and refractions is repeated until the luminous flux is changed to have an angle at which it can emerge from the emergence surface 21f after the total reflection by the prism reflecting surface 21e1. Finally, all the luminous flux emerges from the emergence surface 21f to achieve effective use of the luminous flux from the light source. Consequently, luminous flux emerging outside the necessary irradiation area is basically not present, and the ring light optical system can be formed as an extremely efficient illumination optical system.

In addition, the luminous flux components through the respective prism reflecting surfaces 21e1 or the prism edge surfaces 21e2 as the refractive surfaces emerge with substantially uniform light amounts from substantially the entire emergence surface 21f regardless of the different positions of the reflecting surfaces and the different number of refractions.

Next, the preferred shape of the micro prism portions 21e in Embodiment 1 will be described. First, the inclination of the micro prism portions 21e (the prism reflecting surfaces 21e1) formed on the ring portion 21b desirably falls within the following angle range:

$$25° \leq \theta \leq 50° \quad (1)$$

where $\theta$ represents an inclination angle of the prism reflecting surface 21e1 with respect to the emergence surface 21f. This is specified for the following reasons. Particularly, when an optical resin material for use in a typical illumination optical system is used, a value of the angle $\theta$ larger than the upper limit of 50° cannot realize a desired optical system because the amount of the luminous flux reflected by each prism reflecting surface 21e1 is extremely reduced or the number of emergences from and entrances into the optical member 21 is increased to cause significant loss of light amount due to the associated surface reflection. On the other hand, a value of the angle $\theta$ smaller than the lower limit of 25° cannot provide a desired optical system because the luminous flux emerging from the emergence surface 21f is too inclined with respect to the direction perpendicular to the emergence surface 21f. Embodiment 1 employs 40° which is almost the middle value of the abovementioned angle range.

In addition, the following is desirably satisfied:

$$0.5° \leq \alpha \leq 15° \quad (2)$$

where $\alpha$ represents an angular pitch (a circumferential pitch) of the micro prism portions 21e formed on the ring portion 21b.

This is specified for the following reasons. A value of the angle $\alpha$ smaller than the lower limit of 0.5° cannot provide a desired optical system because an R surface close to a vertex of the prism reflecting surface 21e1 has a greater influence in forming the optical member 21, so that isolation or total reflection depending on the angle of the entering luminous flux, which serves as the direction changing effect desired in Embodiment 1, is not preformed favorably. Even when the prism reflecting surfaces can be formed with a smaller R surface, the resulting optical member is very expensive and is not practical.

On the other hand, the upper limit 15° of $\alpha$ is set for the following reasons. The light emergence portions of the micro prism portions 21e are concentrated on the oblique lines thereof as described above. In other words, a larger pitch of the oblique lines reduces the number of light emergence points to increase the light emergence intensity of each light emergence point (increase the light emergence amount). On the other hand, for an ideal illumination optical system in the macro photography, a larger number of light emergence points each having a low light emergence intensity can provide more excellent characteristics. As a result, basically, a smaller angular pitch is better.

Another reason is that a larger angular pitch causes an increased thickness of each prism forming part of the micro prism portions 21e, so that this is not desirable in terms of a reduction in size. Specifically, while the light guiding portion 21a having the largest possible thickness is advantageous in providing a uniform light distribution characteristic, a larger thickness of the prism of the micro prism portions 21e than necessary does not contribute to any obvious improvement in the optical characteristics, but rather involves an disadvantage from a larger size.

Next, description will be made of the structure in which luminous flux emitted from the light source (the arc tube 4 in Embodiment 1) can emerge from the ring portion 21b uniformly in ring shape when the light source is disposed to overlap with the ring portion 21b.

One of the characteristics of Embodiment 1 is that the arc tube 4 is disposed behind the ring portion 21b and the luminous flux from the LED 2 and the luminous flux from the arc tube 4 emerge uniformly from the same ring portion 21b. Embodiment 1 includes the light guiding member 22 for directing the luminous flux from the flashlight emitter 14 toward the ring portion 21b from the front of the flashlight emitter 14 to the back of the ring portion 21b of the optical member 21 in order to utilize the flashlight emitter 14 contained in the video camera body 11.

The flashlight emitter 14 within the video camera body 11 is formed of the arc tube 4 which emits a large amount of light, the condenser prism 5 which gathers and controls the luminous flux emitted from the arc tube 4, and the reflecting member 6 which mainly reflects part of the luminous flux emitted from the discharge tube 4 and traveling backward to the front.

The luminous flux emerging from the condenser prism 5 enters the light guiding member 22 from the entrance surface 22a. The light guiding member 22 is formed of an optical resin material with high transmittance similarly to the optical member 21. The luminous flux entering from the entrance surface 22a is reflected by a reflecting surface 22b which is metal-evaporated or the like with high reflectivity and formed in front of the entrance surface 22a, and then directed to a ring portion 22c of the light guiding member 22.

The ring portion 22c is a ring-shaped portion having substantially the same diameter and width as those of the ring portion 21b of the abovementioned optical member 21 and is formed to have the largest thickness closest to the light source and a reduced thickness with distance from the light source in the optical axis direction of the image-taking lens. An emergence surface 22d of the ring portion 22c is disposed in proximity to the micro prism portions 21e of the ring portion 21b of the optical member 21. The reflecting member 23 having substantially the same diameter and width as those of the ring portion 22c is disposed in proximity to the surface of the ring portion 22c opposite to emergence surface 22d. The surface of the reflecting member 23 on the side of the light guiding member 22 has high reflectivity.

The luminous flux from the flashlight emitter 14 directed to the ring portion 22c is totally reflected by the surface of the ring portion 22c opposite to the emergence surface 22d and directed toward the emergence surface, or emerges from that opposite surface and then is reflected by the reflecting member 23, again enters the light guiding member 22, and travels toward the emergence surface 22d. Part of the luminous flux that is reflected by the emergence surface 22d is again reflected by the opposite surface or emerges from that surface and is reflected by the reflecting member 23, again enters the light guiding member 22, and travels toward the emergence surface 22d.

As shown in FIG. 9, the reflection angle of the luminous flux reflected by the surface of the ring portion 22c opposite to the emergence surface 22d or the reflecting member 23 is gradually reduced through the repeated reflections since the ring portion 22c has the gradually reduced thickness with distance from the light source. When the incident angle on the emergence surface 22d after the reflections becomes smaller than the critical angle, it emerges from the emergence surface 22d. The series of the reflections of the luminous flux in the ring portion 22c in this manner causes the luminous flux from the flashlight emitter 14 to emerge from the entire circumference of the emergence surface 22d of the ring portion 22c with substantially uniform light amount distribution.

As shown in FIG. 9, the luminous flux emerges from the ring portion 22c at a steep angle generally along the emergence surface 22d and enters the optical member 21 from each prism edge surface 21e2 in the micro prism portion 21e of the optical member 21. The luminous flux entering from the prism edge surface 21e2 is totally reflected by each prism reflection surface 21e1 and emerges from the emergence surface 21f of the optical member 21.

As shown in FIG. 8, in Embodiment 1 including all the prism reflection surfaces 21e1 formed at substantially the same angles, the luminous flux emerging from the flashlight emitter 14 emerges substantially uniformly over the entire circumference of the emergence surface 21f in the direction slightly inclined with respect to the direction perpendicular to the emergence surface 21f of the optical member 21. However, as described above, even when the emerging luminous flux component at each position is inclined with respect to the optical axis of emergence, the emergence surface 22d is ring-shaped, they act to complement each other, and uniform illumination can be achieved.

As described above, the luminous flux emerging from the ring portion 22c of the light guiding member 22 enters the optical member 21, not from the prism reflecting surface 21e1 of the optical member 21 but from a portion of the prism edge surface 21e2 close to the tip (rear end) formed between adjacent prism reflecting surfaces (to connect the prism reflection surfaces). Then, the luminous flux is totally reflected by the adjacent prism reflecting surface 21e1 in the traveling direction and emerges from the emergence surface 21f of the optical member 21.

The traveling of the luminous flux in the ring portion 22c as described above is effective for the light source which emits light having uniform distribution in a wide angle range, especially the luminous flux from the flashlight emitter 14 shown in Embodiment 1. The gradually changing thickness of the light guiding member 22 to have the minimum thickness close to the end allows almost all the luminous flux to be incident on the prism edge surface 21e2 of the optical member 21 and to emerge from the emergence surface 22d in an unchanged direction with substantially uniform angle distribution and substantially uniform light amount distribution.

While Embodiment 1 employs the metal-evaporated surface as the reflecting surface 22b of the light guiding member 22, the surface is not necessarily limited thereto and can be realized by a total reflection surface with a gentle inclination if extra space is available in that portion. It is also possible that a reflecting member with substantially the same shape as that of the reflecting surface 22d is disposed outside the reflecting surface 22d to reflect and return the component transmitted through the reflecting surface 22d into the light guiding member 22.

Embodiment 1 has been described in conjunction with the case where the luminous flux emerges with a uniform light amount over the entire circumference of the ring portion 21b of the optical member 21. However, the light is not necessarily cause to emerge from the entire circumference of the ring portion 21b. For example, flashlight may be emitted only from an upper portion of the ring portion 21b, or light may be emitted only from intermittent portions in the circumferential direction of the ring portion 21b.

In addition, Embodiment 1 has been described with the optical member 21 and the light guiding member 22 made of the optical resin material. However, any optical resin material other than the abovementioned acrylic resin or polycarbonate resin may be used or they may be formed through glass molding. The optical member 21 and the light guiding member 22 may be made of different materials.

Embodiment 1 has been described with the ring light adapter removably mounted on the image-taking apparatus, but a ring light having the same structure may be provided integrally with (contained in) an image-taking apparatus.

Embodiment 2

FIGS. 10 to 13 show a ring light adapter for macro photography which is Embodiment 2 of the present invention. Embodiment 2 is a variation of Embodiment 1, and the following description will be focused on differences from Embodiment 1. The components identical to those in Embodiment 1 are designated with the same reference numerals in Embodiment 1 and detailed description thereof is omitted.

Figure 10:
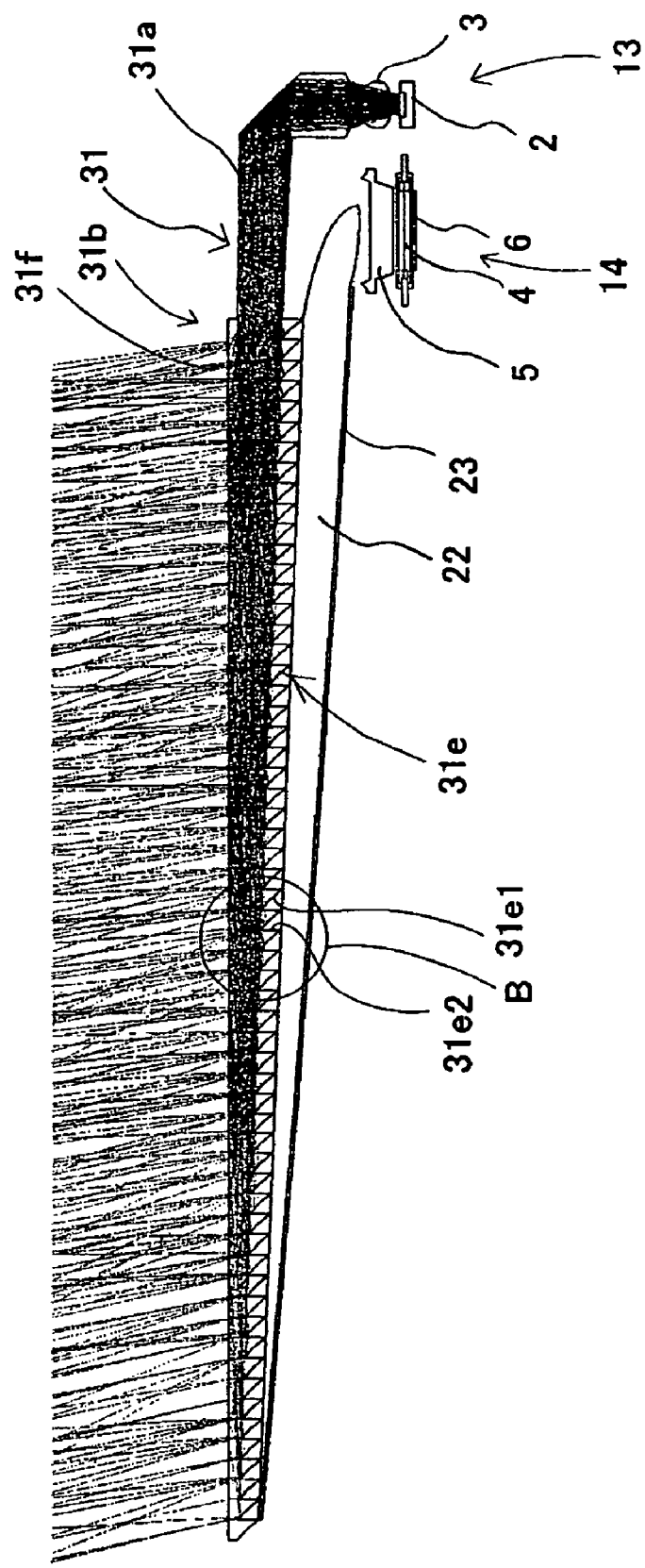
FIG. 10 is a section view showing a ring portion developed in the circumferential direction in a ring light adapter for macro photography which is Embodiment 2 of the present invention and also shows a light ray tracing diagram.
Figure 11:
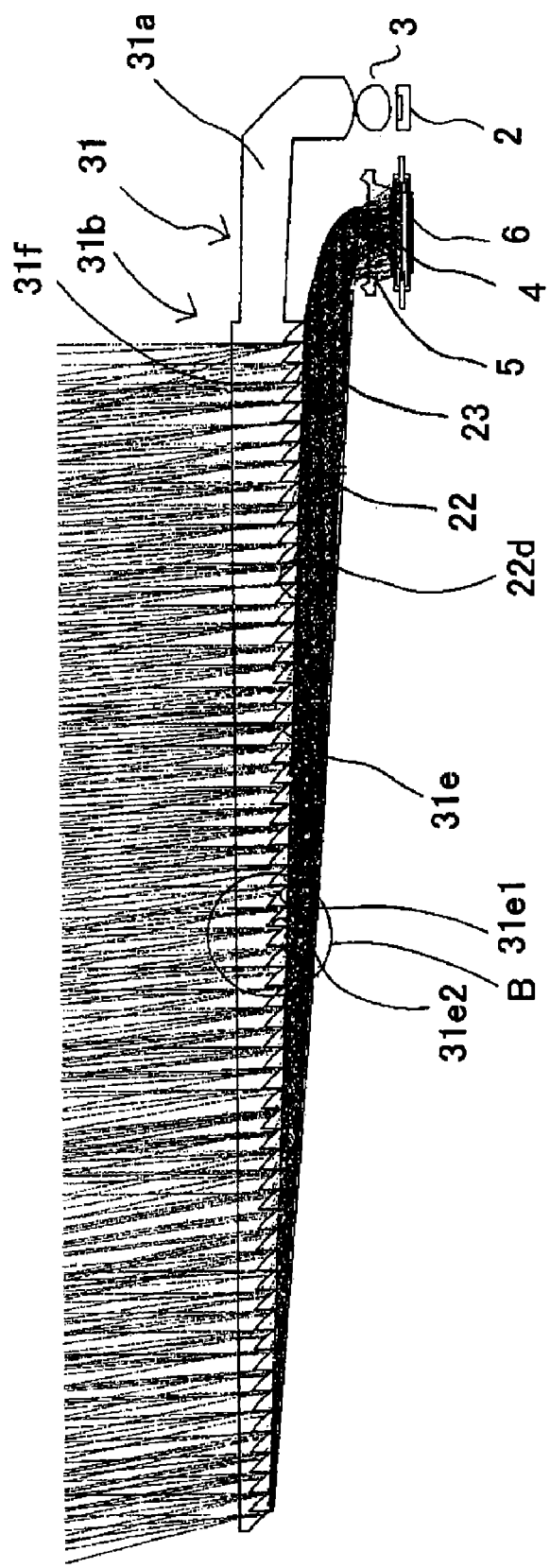
FIG. 11 is another section view showing the ring portion of an optical system of Embodiment 2 developed in the circumferential direction.
Figure 12:
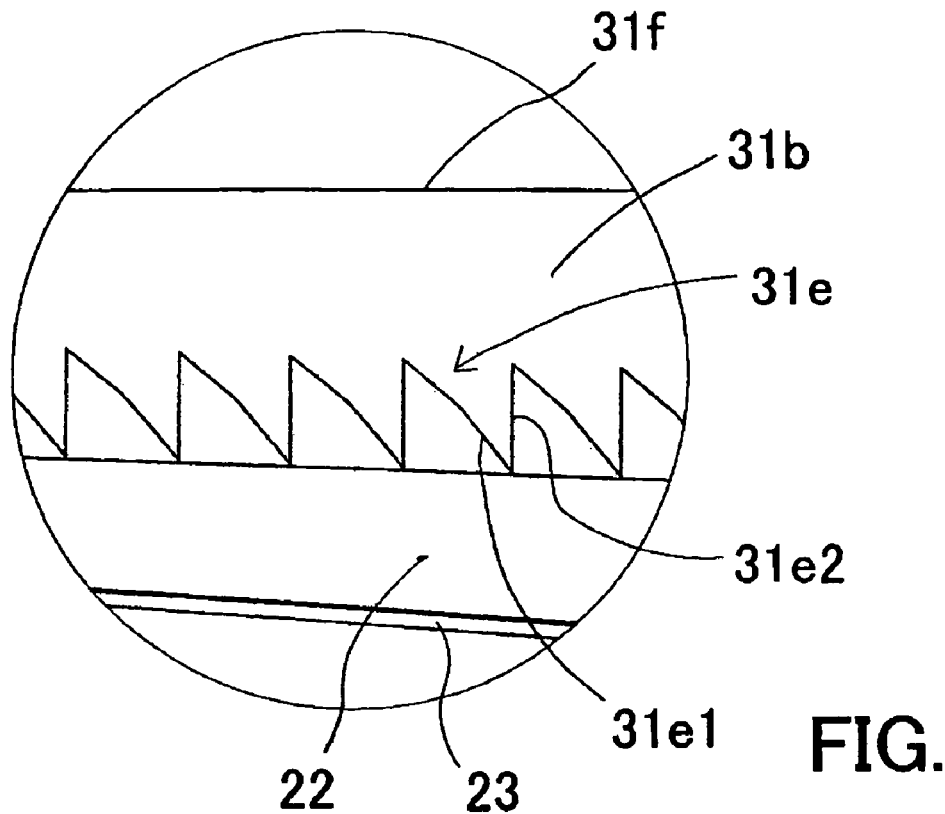
FIG. 12 is an enlarged view of part of FIG. 11.
Figure 13:
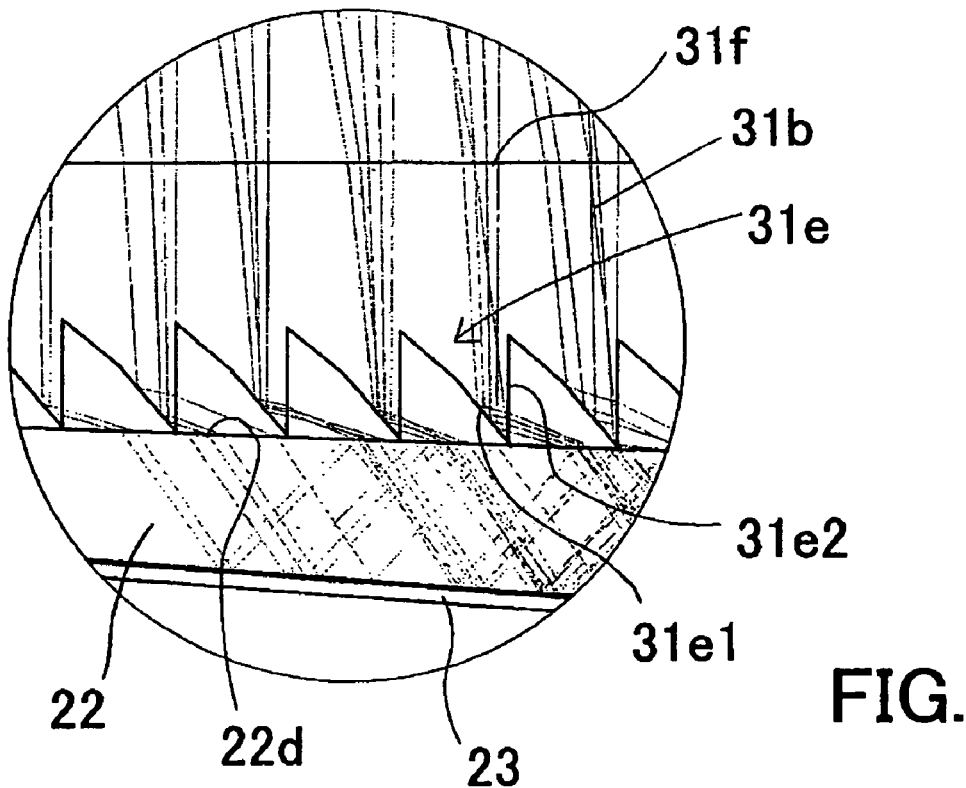
FIG. 13 is a partially enlarged view of FIG. 11.

FIG. 10 is a section view showing a ring portion of a ring light optical system developed in the circumferential direction in the ring light adapter for macro photography of Embodiment 2 and also shows a light ray tracing diagram of luminous flux emitted from an LED 2. FIG. 11 is a section view showing the ring portion of the ring light optical system developed in the circumferential direction and also shows a light ray tracing diagram of luminous flux emitted from an arc tube 4. FIGS. 12 and 13 are enlarged views of part of the section view (a portion B) in FIG. 11. FIG. 12 shows only the shape of the portion, while FIG. 13 shows a light ray tracing diagram added to the portion.

Embodiment 2 changes luminous fluxes emitted from two light sources to emerge from the ring portion in substantially the same directions. Specifically, in Embodiment 1, the luminous flux emitted from the LED emitter 13 emerges from the ring portion 21b of the optical member 21 at the relatively small inclination with respect to the direction perpendicular to the emergence surface 21f (the optical axis direction of the image-taking lens), while the luminous flux emitted from the flashlight emitter 14 emerges at the relatively large inclination. The difference in the inclination of the emergence direction between the light sources is not preferred, and Embodiment 2 is provided to make improvements to that point.

In FIGS. 10 to 13, reference numeral 31 shows an optical member made of a transparent resin material which passes light, with a partially different shape from that in Embodiment 1. Reference numeral 31a shows a light guiding portion of the optical member 31, 31b an emergence portion of the optical member 31. The components other than the optical member 31 are identical to those in Embodiment 1.

Embodiment 2 employs the following structure for changing the luminous fluxes emitted from the two light sources to emerge from the ring portion in substantially the same directions as described above.

First, description will be made of the shape of prism reflecting surfaces 31e1 in micro prism portions 31e of the optical member 31 in Embodiment 2 primarily with reference to FIG. 12.

In Embodiment 1, the optical member 21 is responsible for all the effects from the direction change to the emergence in ring shape of the luminous flux emitted from the LED light emitter 13. In this case, only the portion of the prism reflecting surface 21e1 close to the foot of the micro prism portion 21e contributes to the direction change of the luminous flux in the micro prism portion 21e. The flashlight is directed by the light guiding member 22, emerges generally along the emergence surface 22d, and the emergence direction thereof is changed by using only the tip of the prism reflecting surface 21e1. In other words, the emergence directions of the luminous fluxes from the LED light emitter 13 and the flash light emitter 14 are controlled by the different portions of the prism reflecting surface 21e1. Since the prism reflecting surfaces 21e1 are set to have the same inclination at the foot and the tip in Embodiment 1, the luminous fluxes from the LED light emitter 13 and the flashlight emitter 14 emerge in the different directions as described above.

In Embodiment 2, however, a prism reflecting surface 31e1 has different inclinations at its foot and its tip. Specifically, as shown in FIGS. 12 and 13, the inclination at the tip of the prism reflecting surface 31e1 with respect to an emergence surface 31f of the ring portion 31b is larger than the inclination at the foot. These angles are optimized for the luminous flux from the LED light emitter 13 and the luminous flux from the flashlight emitter 14 to realize substantially the same emergence directions of the luminous fluxes from the two light sources.

As shown in FIG. 13, the luminous flux emerges from a light guiding member 22 generally along an emergence surface 22d of the light guiding member 22 and is transmitted through a prism edge surface 31e2 of the optical member 31. Then, the luminous flux is totally reflected by the tip of the prism reflecting surface 31e1 and changed to have a predetermined angle, followed by emergence from the emergence surface 31f of the ring portion 31b of the optical member 31.

FIGS. 10 and 11 show the luminous flux emerging in the changed directions. As shown in FIG. 10, the luminous flux from the LED light emitter 13 emerges from the emergence surface 31f in substantially the same directions as in Embodiment 1. In addition, as shown in FIG. 11, almost all the luminous flux from the flashlight emitter 14 emerges from the emergence surface 31f in substantially the same directions as that of the luminous flux from the LED light emitter 13, and each of them has uniform light amount distribution.

Embodiment 2 has been described in conjunction with the case where the prism reflecting surface 31e1 formed on the optical member 31 is divided into the two areas of the tip and foot having the different inclinations to facilitate the description. The prism reflecting surface may be divided into more areas with different inclinations, or the prism reflecting surface may be formed as a curved surface with a continuously changing inclination.

In addition, the inclination of the prism reflecting surface with respect to the emergence surface may be gradually changed in the circumferential direction of the ring portion, both in Embodiment 2 and Embodiment 1 described above.

Embodiment 3

FIGS. 14 to 19 show a ring light for macro photography which is Embodiment 3 of the present invention. Embodiment 3 is a variation of Embodiment 1.

Figure 14:
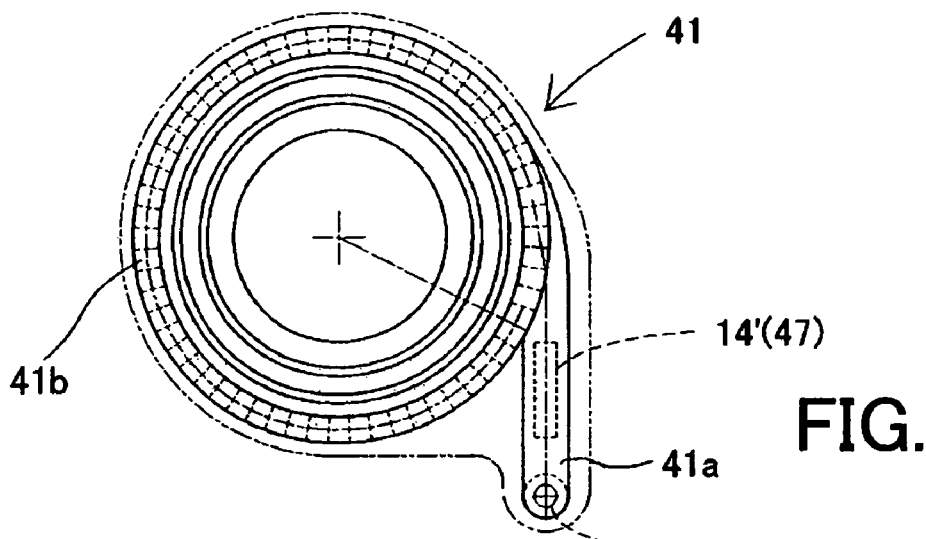
FIG. 14 is a front view of a ring portion of an optical system of a ring light adapter for macro photography which is Embodiment 3 of the present invention when viewed from the direction of an emergence surface.
Figure 15:
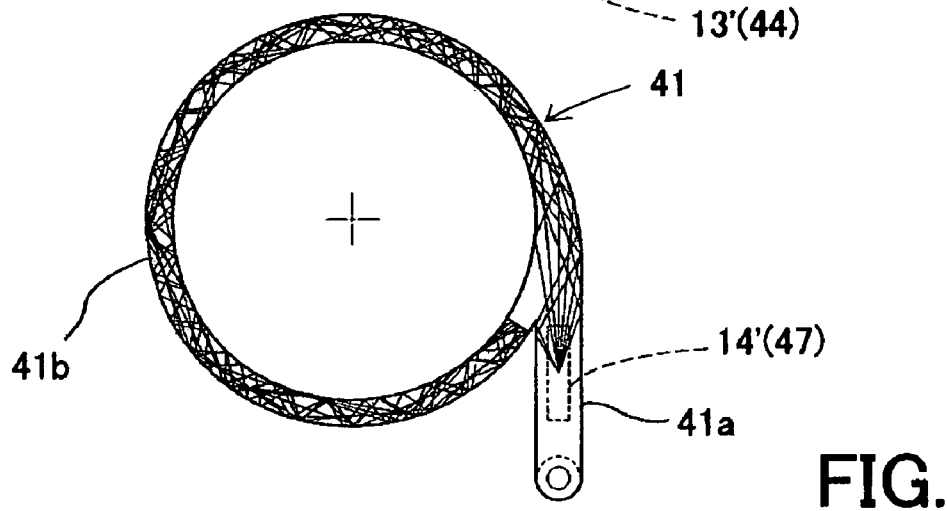
FIG. 15 shows a light ray tracing diagram added to FIG. 14.
Figure 16:
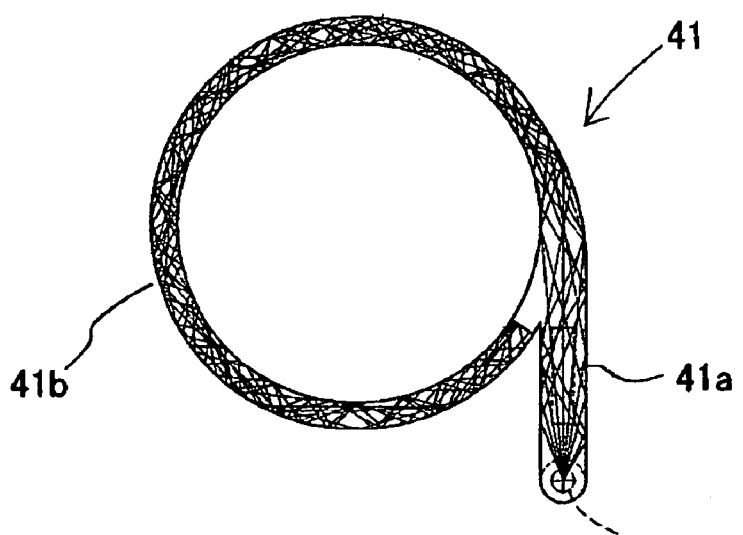
FIG. 16 shows a light ray tracing diagram added to FIG. 14.
Figure 17:
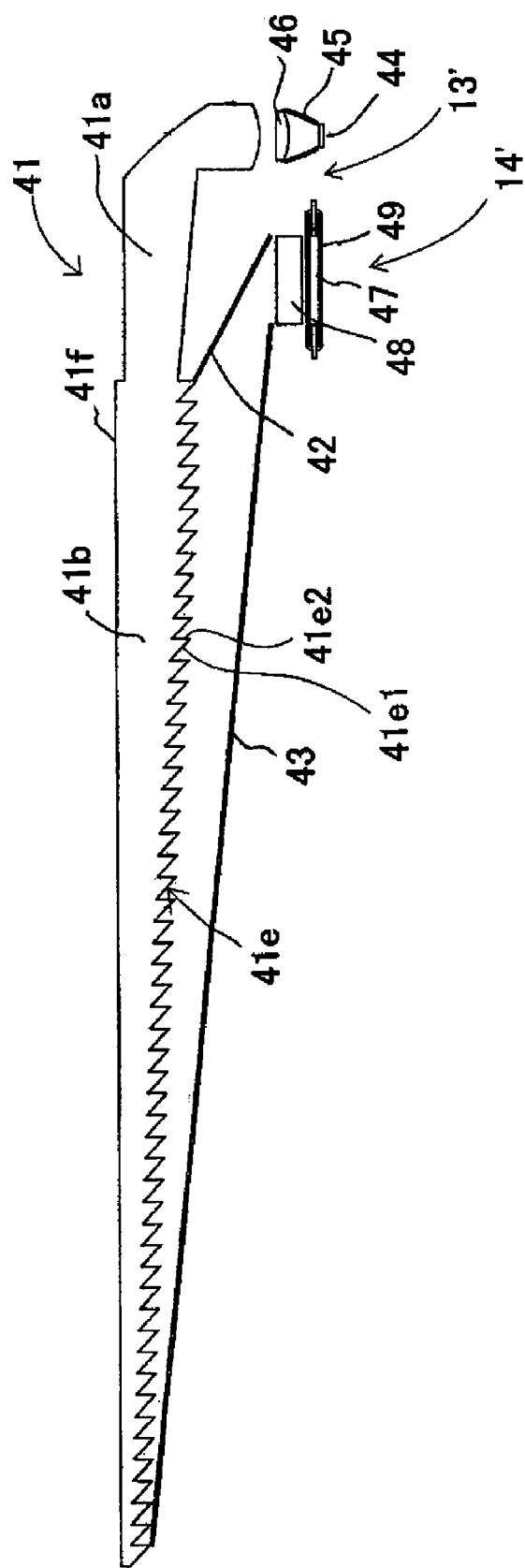
FIG. 17 is a section view of the ring portion developed in the circumferential direction in the optical system of Embodiment 3.
Figure 18:
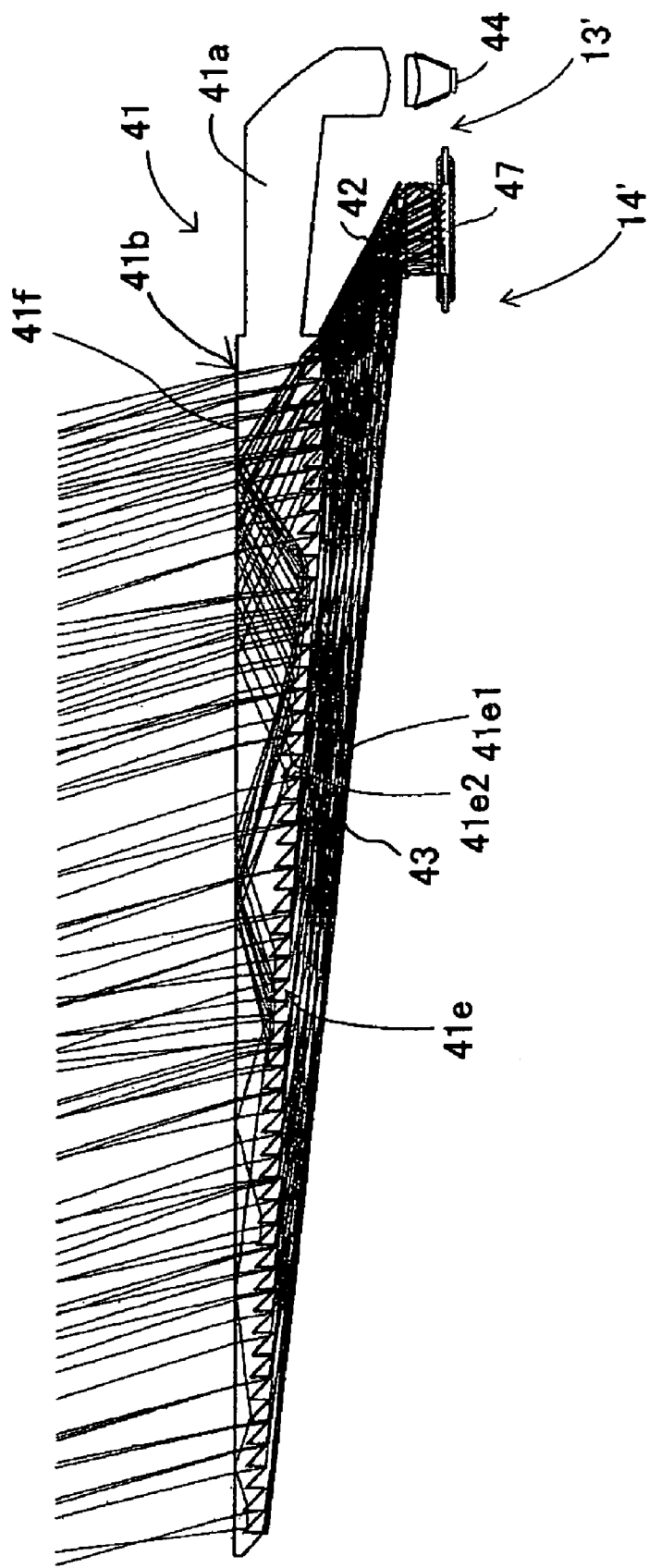
FIG. 18 shows a light ray tracing diagram added to FIG. 17.
Figure 19:
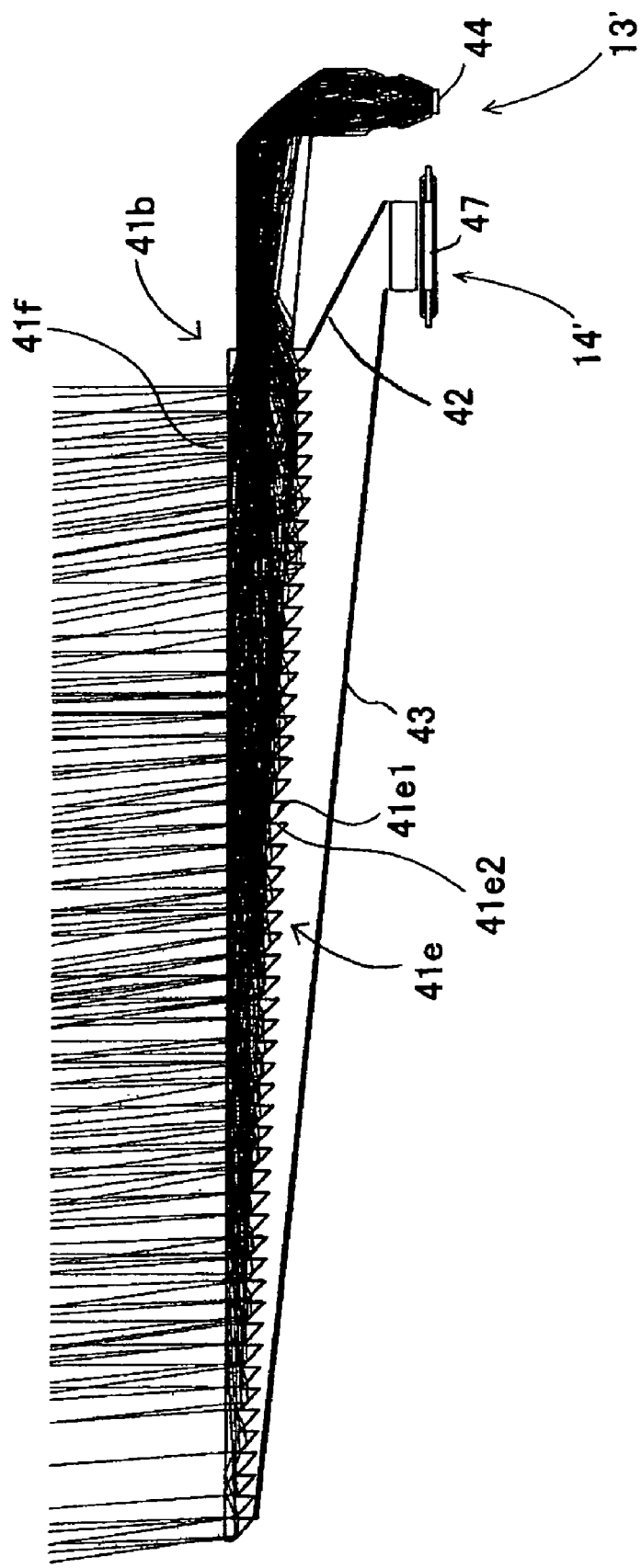
FIG. 19 shows a light ray tracing diagram added to FIG. 17.

FIG. 14 is a front view of a ring portion in a ring light optical system of the ring light for macro photography in Embodiment 3 when viewed from the direction of an emergence surface. FIG. 15 shows a light ray tracing diagram of representative luminous flux from a flashlight emitter added to the ring light optical system in FIG. 14. FIG. 16 shows a light ray tracing diagram of representative luminous flux from an LED light emitter added to the ring light optical system in FIG. 14. FIG. 17 is a section view of the ring portion of the ring light optical system developed in the circumferential direction. FIG. 18 shows a light ray tracing diagram of representative luminous flux from the flashlight emitter added to FIG. 17. FIG. 19 shows a light ray tracing diagram of representative luminous flux from the LED light emitter added to FIG. 17.

Embodiment 1 employs a reflecting member serving as a light guiding member instead of the light guiding member 22 made of the transparent body used in Embodiment 1. A flashlight emitter 14' is not positioned immediately behind the ring portion as in Embodiment 1 but positioned away from the ring portion. An additional difference from Embodiments 1 and 2 is that both of the flashlight emitter 14' and an LED light emitter 13' are placed on the right of an image-taking lens barrel. Since such a layout is used, luminous flux in the ring portion travels counterclockwise in the circumferential direction when viewed from the front as shown in FIGS. 15 and 16, unlike Embodiments 1 and 2.

In each of FIGS. 14 to 19 for Embodiment 3, reference numeral 41 shows an optical member which has a light guiding portion 41a receiving luminous flux from the LED light emitter 13' and a ring portion 41b which causes the luminous flux directed thereto from the light guiding member 41a to emerge in ring shape. A plurality of micro prism portions 41e similar to those in Embodiment 1 are formed on the side of the ring portion 41b opposite to an emergence surface 41f.

Reference numeral 42 shows a first reflecting member serving as a light guiding member disposed in front of the flashlight emitter 14'. Reference numeral 43 shows a second reflecting member serving as a light guiding member which reflects the luminous flux from the flashlight emitter 14' to enter the micro prism portions 41a through prism edge surfaces 41e2. The first and second reflecting members 42 and 43 have reflecting surfaces with high luminance opposite to the optical member 41.

Reference numeral 44 shows an LED, 45 a reflecting member which gathers luminous flux emitted from the LED 44, and 46 a condenser lens which gathers the luminous flux emitted from the LED 44. Reference numeral 47 shows an arc tube (a xenon light-emitting discharge tube) which emits flashlight, 48 a condenser prism which gathers the luminous flux emitted from the arc tube 47, and 49 a reflecting member which mainly reflects part of the luminous flux emitted from the arc tube 47 that travels backward.

As shown in FIGS. 15 and 18, the luminous flux emitted from the arc tube 47 is gathered by the effects of the condenser prism 48 and the reflecting member 49 and reflected by the first and second reflecting members 42 and 43, and thus directed into the ring portion 41b of the optical member 41 from the prism edge surfaces 41e2 of the micro prism portions 41e. The luminous flux travels counterclockwise within the ring portion 41b in FIG. 15.

At this point, if the luminous flux satisfies the condition of an angle at which it travels within the ring portion 41b, the luminous flux travels within the ring portion 41b while repeating total reflection without emerging outside the ring portion 41b, so that the luminous flux from the arc tube 47 can be used with excellent efficiency. Finally, the luminous flux within the ring portion 41b emerges from the emergence surface 41f of the optical member 41 after total reflection by the prism reflecting surface 41e1, similarly to Embodiment 1.

As shown in FIGS. 16 and 19, the luminous flux emitted from the LED 44 is gathered by the effects of the reflecting member 45 and the condenser lens 46 and directed to the ring portion 41b through the light guiding portion 41a of the optical member 41. In FIG. 16, the luminous flux travels counterclockwise within the ring portion 41b. Similarly to the luminous flux from the arc tube 47, if the luminous flux satisfies the condition of an angle at which it travels within the ring portion 41b, the luminous flux travels within the ring portion 41b while repeating total reflection without emerging outside the ring portion 41b, so that the luminous flux from the LED 44 can be used with excellent efficiency. Finally, the luminous flux within the ring portion 41b emerges from the emergence surface 41f of the optical member 41 after total reflection by the prism reflecting surface 41e1, similarly to Embodiment 1.

Embodiment 3 in which the luminous flux from the arc tube 47 is directed to the optical member 41 by the first and second reflecting members 42 and 43 has the possibility of reduced directivity of the emerging luminous flux as compared with the case where the light guiding member made of the material which passes light is used as in Embodiment 1. However, ring-shaped illumination can be provided from the ring portion 41b of the optical member 41 with sufficient and uniform light amount distribution.

In contrast, since only the reflecting members 42 and 43 are large members other than the optical member 41 in Embodiment 1, the device can be formed at lower cost than in Embodiment 1.

Embodiment 4

Figure 20:
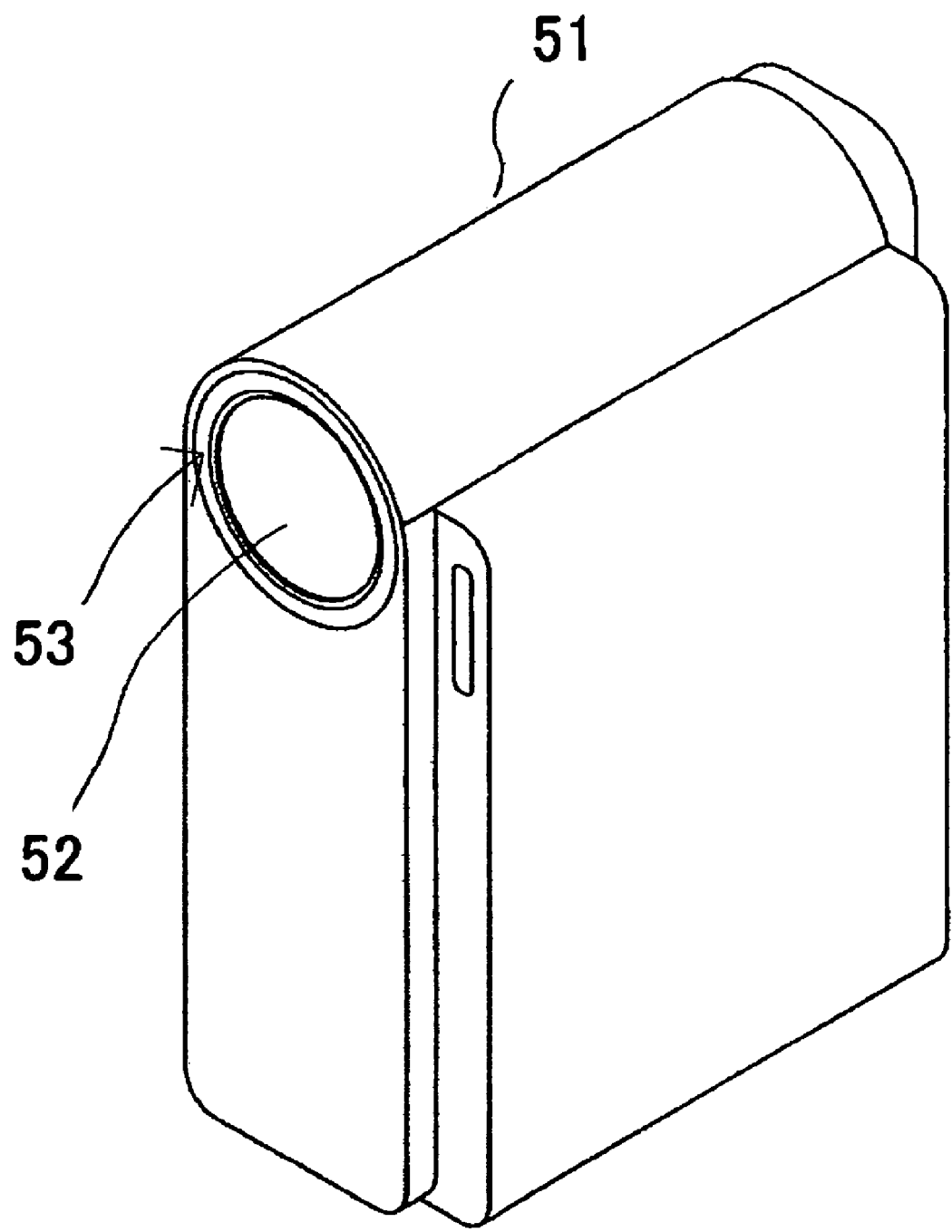
FIG. 20 is a perspective view showing a video camera which contains a ring light-emitting device which is Embodiment 4 of the present invention.
Figure 21:
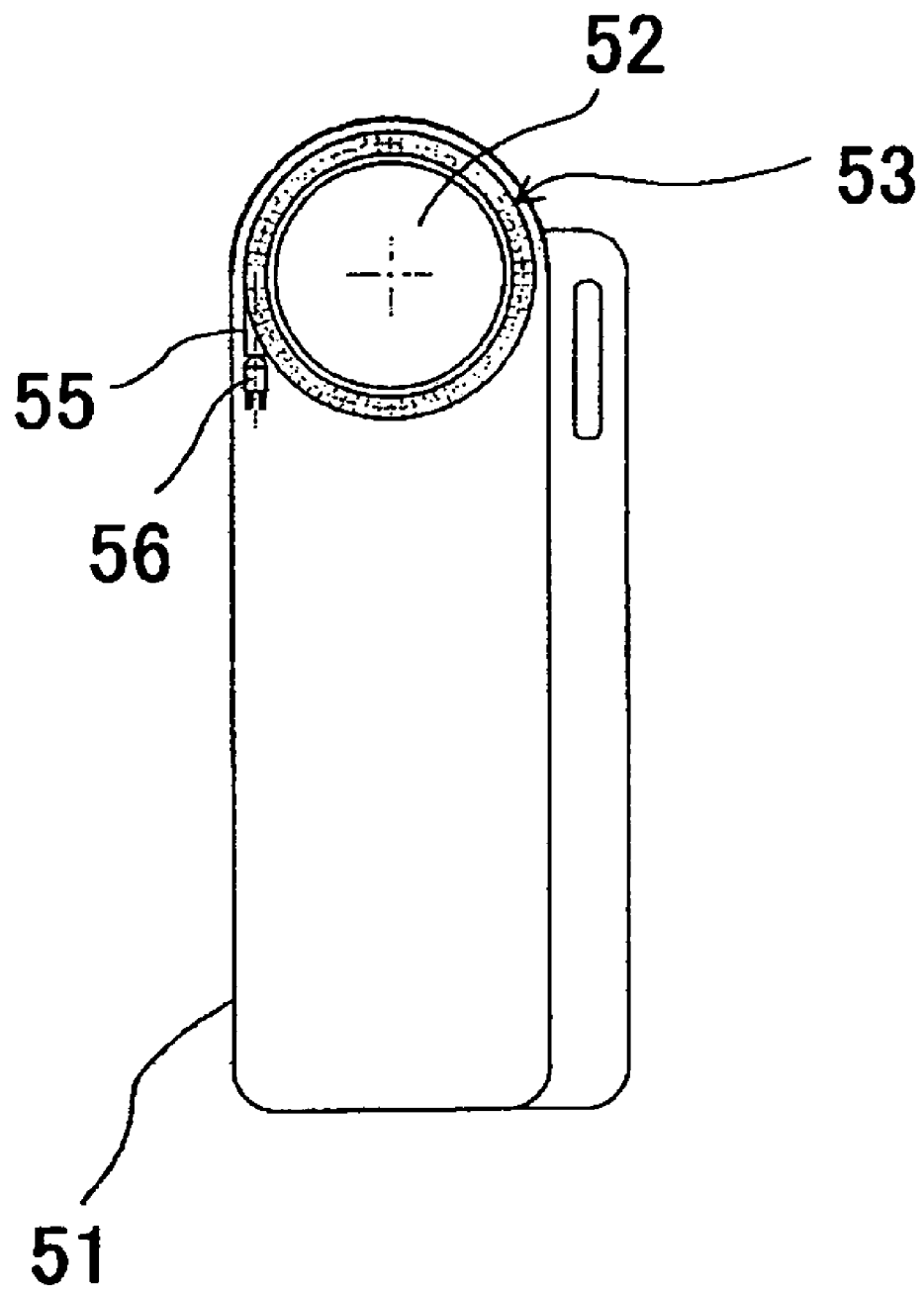
FIG. 21 is a front view of the video camera of Embodiment 4.
Figure 22:
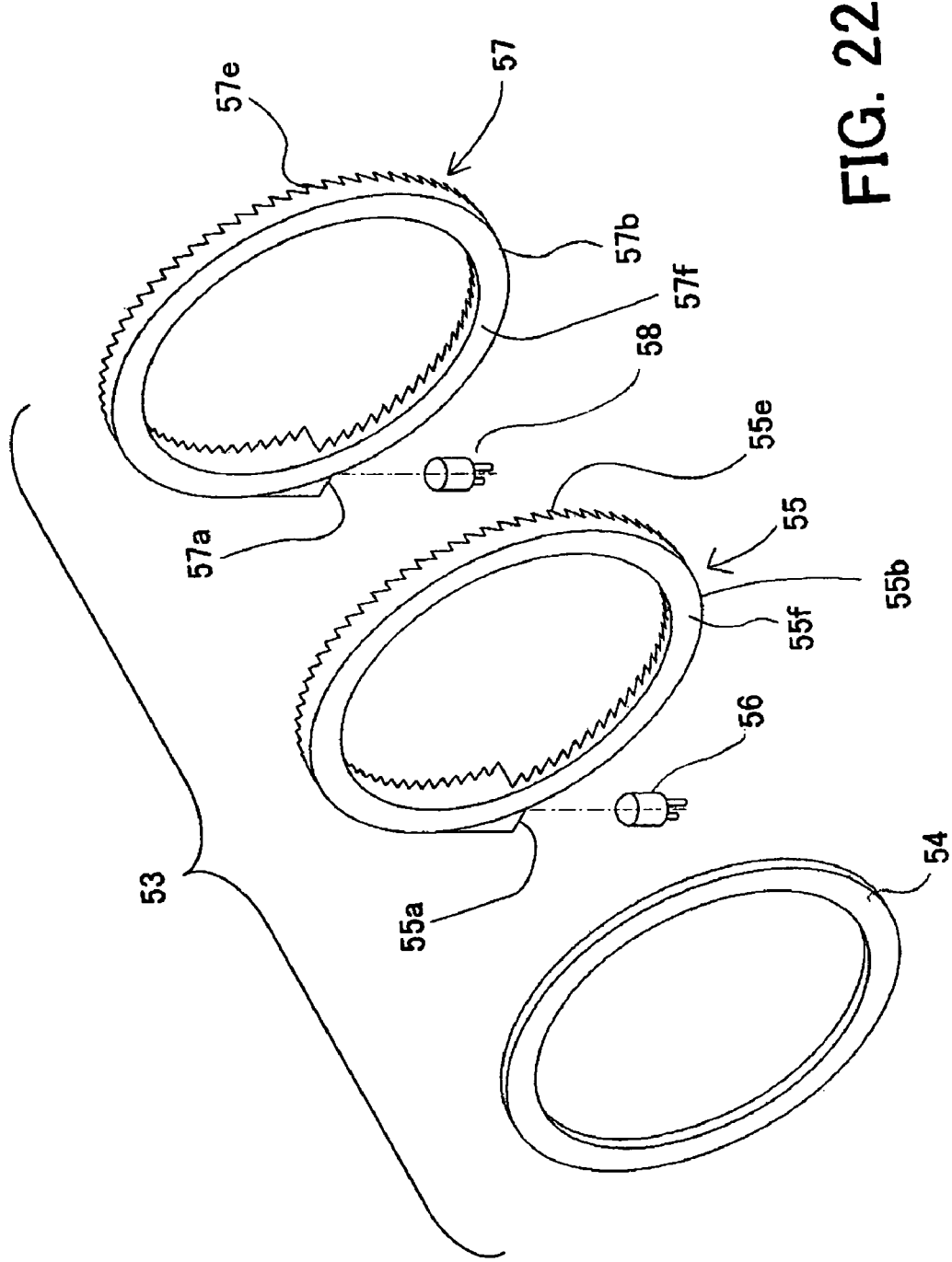
FIG. 22 is an exploded perspective view showing optical members which constitute the ring light-emitting device of Embodiment 4.

FIGS. 20 to 22 show a ring light-emitting device which is Embodiment 4 of the present invention and is contained in an image-taking lens barrel of a video camera.

FIG. 20 is a perspective view of the video camera. FIG. 21 is a front view of the video camera. FIG. 22 is an exploded perspective view of an optical system (hereinafter referred to as a ring light optical system) constituting the ring light-emitting device contained in the video camera.

As shown in FIGS. 20 and 21, the ring light-emitting device of Embodiment 4 is contained in a circumferential portion of the image-taking lens barrel at the end thereof in the video camera and causes luminous flux from a plurality of LED light emitters disposed within the video camera to emerge from a common (same) ring portion.

In FIGS. 20 to 22, reference numeral 51 shows a video camera body, 52 the image-taking lens barrel, and 53 the ring light-emitting device. The ring light-emitting device 53 is formed as shown in FIG. 22.

In FIG. 22, reference numeral 54 shows a protective panel which is made of a transparent optical material for protecting a first optical member 55. The first optical member 55 is disposed at the back of the protective panel 54 (close to an image plane). Reference numeral 56 shows a first LED which is disposed on the outer side of the first optical member 55 in the diameter direction and has high directivity of luminous flux emitted therefrom. Reference numeral 57 shows a second optical member disposed at the back of the first optical member 55. Reference numeral 58 shows a second LED which is disposed on the outer side of the second optical member 57 in the diameter direction and has high directivity of luminous flux emitted therefrom. The second optical member 57 serves as a light guiding member for the first optical member 55.

As shown, in Embodiment 4, the first and second LEDs 56 and 58 are disposed to coincide with each other when viewed from the front to facilitate electric implementation. The first optical member 55 and the second optical member 57 basically have the same shapes and are arranged side by side such that their centers generally match the optical axis of the image-taking lens. The first and second LEDs 56 and 58 have substantially the same shapes and characteristics.

Figure 23:
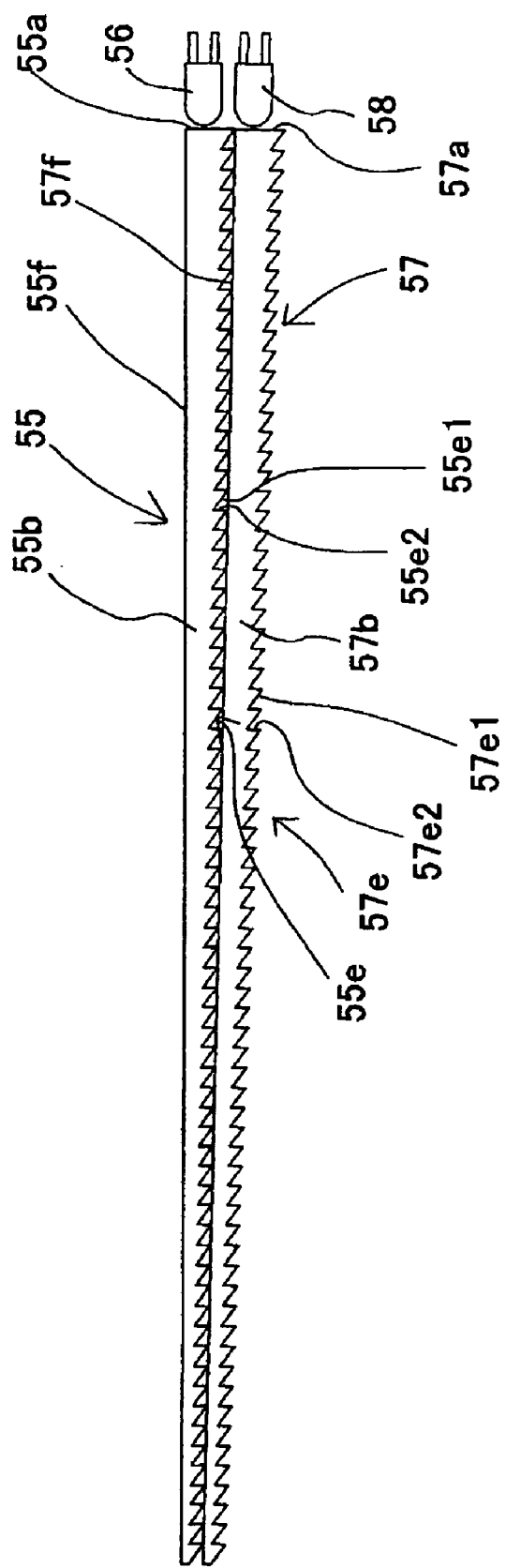
FIG. 23 is a section view of a ring portion developed in the circumferential direction in an optical system of the ring light-emitting device of Embodiment 4.

Next, description will be made of components which provide optical characteristics of the ring light-emitting device 53. As shown in FIG. 23, each of the first and second LEDs 56 and 58 is a high-luminance white LED which has a dome-shaped end and can emit fixed light during a certain time period with extremely high directivity. A certain level of electric current can be applied thereto as long as it is instantaneous, and they also can provide illumination for still images (illumination substituted for flash).

The first and second optical members 55 and 57 are optical members which pass light and change luminous fluxes emitted from the first and second LEDs 56 and 58 into ring-shaped luminous fluxes, respectively, and each of them is made of an optical resin material with high transmittance such as acrylic resin or polycarbonate resin. The first and second optical members 55 and 57 have entrance surfaces 55a and 57a which receive luminous fluxes from the respective LEDs, and ring-shaped emergence portions (hereinafter referred to as ring portions) 55b and 57b to which the luminous fluxes from the entrance surfaces 55a and 57a are directed, respectively.

A plurality of micro prism portions 55e and 57e are formed on the ring portions 55b and 57b in the circumferential direction on the side opposite to the emergence surfaces 55f and 57f. The micro prism portions 55e and 57e change the luminous fluxes directed to the ring portions 55b and 57b to travel toward the optical axis of the image-taking lens (toward an object) and to have ring shape. Each of the ring portions 55b and 57b is formed to have a larger thickness in the optical axis direction of the image-taking lens closer to the light source and a smaller thickness with distance from the light source.

Embodiment 4 greatly differs from Embodiment 1 in that the two optical members 55 and 57 having a number of micro prism portions 55e and 57e formed on the side opposite to the emergence surface are arranged side by side instead of the light guiding member 22 used in Embodiment 1. The two optical members 55 and 57 formed in the same shape can reduce the cost of the entire device even when they are complicatedly shaped.

As shown in FIGS. 21 and 22, Embodiment 4 differs from Embodiments 1 to 3 in that the luminous fluxes from the first and second LEDs 56 and 58 are incident on the entrance surfaces 55a and 57a adjacent to the outer circumferential surfaces of the ring potions 55b and 57b of the first and second optical members 55 and 57. In Embodiments 1 to 3 described above, the direction of the luminous flux is changed to be directed to the ring portion and this involves a reduction in the efficiency (loss of light amount) to some degree. Embodiment 4, however, requires no direction change, which minimizes loss of light amount to provide high efficiency.

Figure 24:
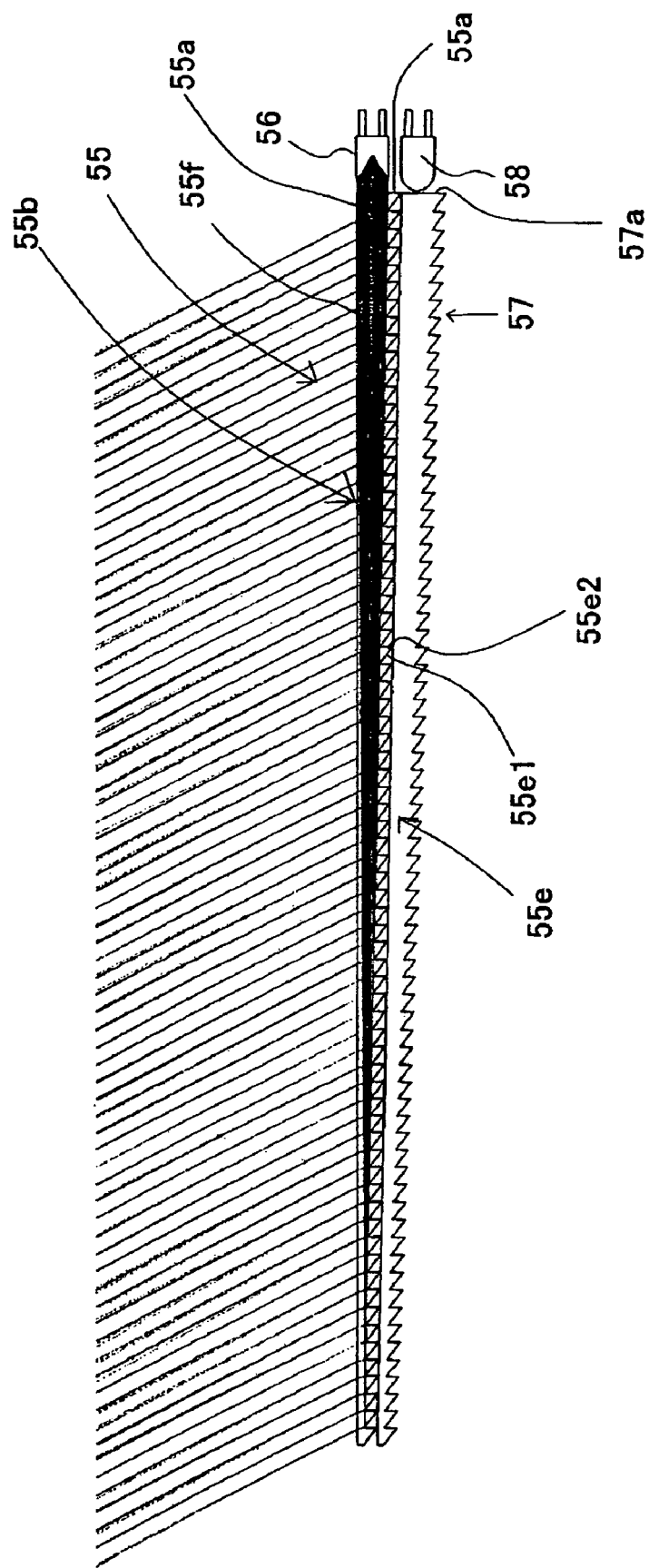
FIG. 24 shows a light ray tracing diagram added to FIG. 23.
Figure 25:
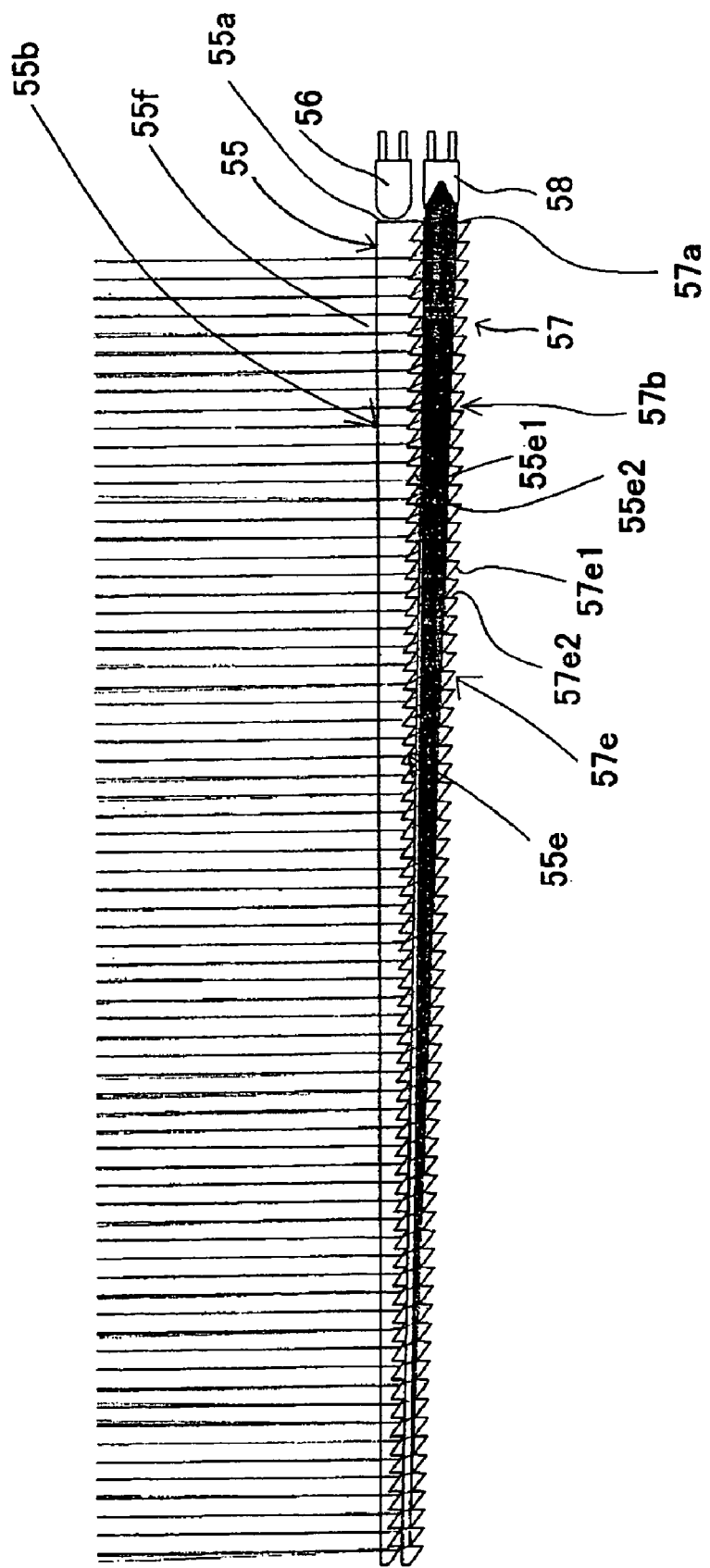
FIG. 25 shows a light ray tracing diagram added to FIG. 23.

Description will hereinafter be made of the specific shape of the ring light optical system of Embodiment 4 with reference to FIGS. 23 to 25. FIG. 23 is a section view of the ring portion of the ring light optical system developed in the circumferential direction. FIG. 24 shows a light ray tracing diagram of the luminous flux emitted from the first LED added to FIG. 23. FIG. 25 shows a light ray tracing diagram of the luminous flux emitted from the second LED added to FIG. 23.

As shown in FIG. 24, the luminous flux emitted from the first LED 56 is caused to emerge from the emergence surface 55f by the first optical member 55 at a certain angle with respect to the direction perpendicular to the emergence surface 55f (the optical axis direction of the image-taking lens).

As shown in FIG. 25, the luminous flux emitted from the second LED 58 is caused to emerge from the emergence surface 57f by the second optical member 57 at a certain angle with respect to the direction perpendicular to the emergence surface 55f before entrance into the first optical member 55.

The luminous flux emerging from the second optical member 57 enters the first optical member 55 from a prism reflecting surface 55e1, not from a prism edge surface 55e2 as shown in Embodiments 1 to 3. The luminous flux is refracted by the prism reflecting surface 55e1 and emerges from the emergence surface 55f.

In this manner, Embodiment 4 achieves a predetermined light distribution characteristic by causing the luminous flux from the second optical member 57 to enter the first optical member 55 from the prism reflecting surface 55e1 and using the refraction by the prism reflecting surface 55e1.

While Embodiment 4 has been described with the use of the plurality of white LEDs as the light source, the present invention is not limited thereto, and it is possible to use a plurality of LEDs or lamps with different colors as the light source. While Embodiment 4 has been described with the plurality of optical members having the same shape disposed side by side, they do not necessarily have the same shape but a plurality of optical members having different shapes may be put side by side. In addition, Embodiment 4 has been described a case where the first and second optical members were disposed so as to overlap the first and second LEDs when viewed from the optical axis direction. But they may be arranged in different positions when viewed from the optical axis direction. Furthermore, while Embodiment 4 has been described with the two optical members arranged side by side for the two light sources, three or more optical members may be arranged side by side for three or more light sources.

While Embodiment 4 has been described with the light-emitting device contained in the image-taking apparatus, the light-emitting device may be mounted removably on the image-taking apparatus.

Embodiment 5

FIGS. 26 to 29 show a ring light-emitting device which is Embodiment 5 of the present invention and is contained in an image-taking lens barrel of a video camera. Embodiment 5 is a variation of Embodiment 4, and the following description will be focused on differences from Embodiment 4. The components identical to those in Embodiment 4 are designated with the same reference numerals in Embodiment 4 and detailed description thereof is omitted.

Figure 26:
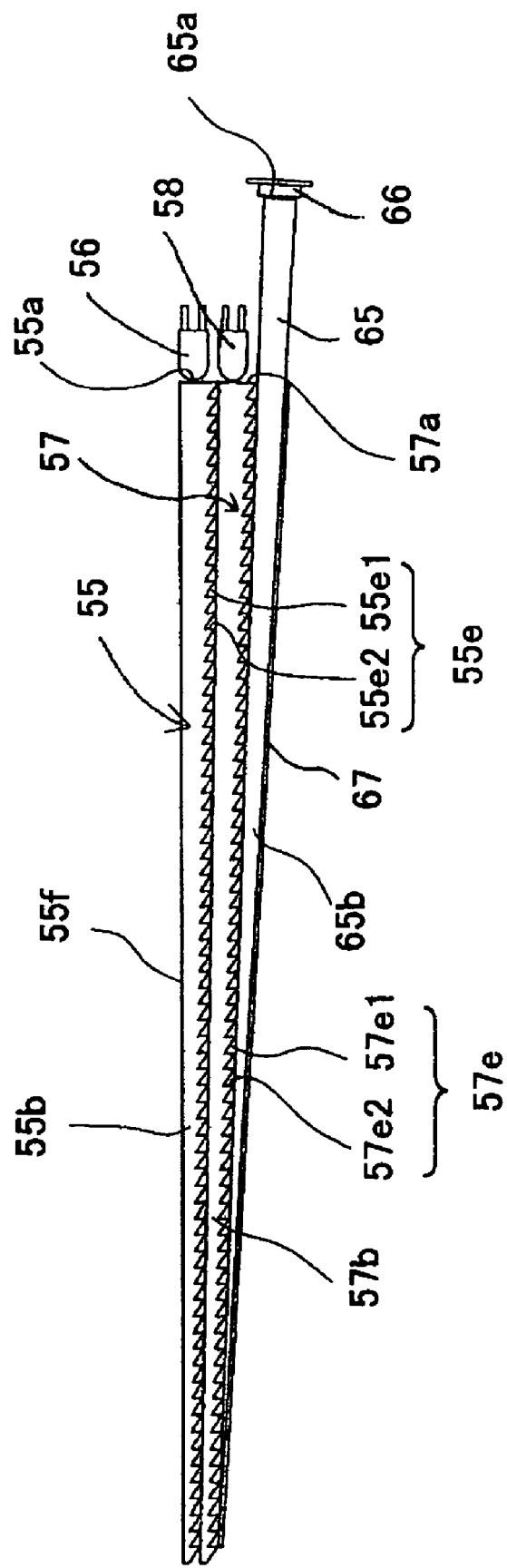
FIG. 26 is a section view showing a ring portion developed in the circumferential direction in an optical system of a ring light-emitting device which is Embodiment 5 of the present invention.
Figure 27:
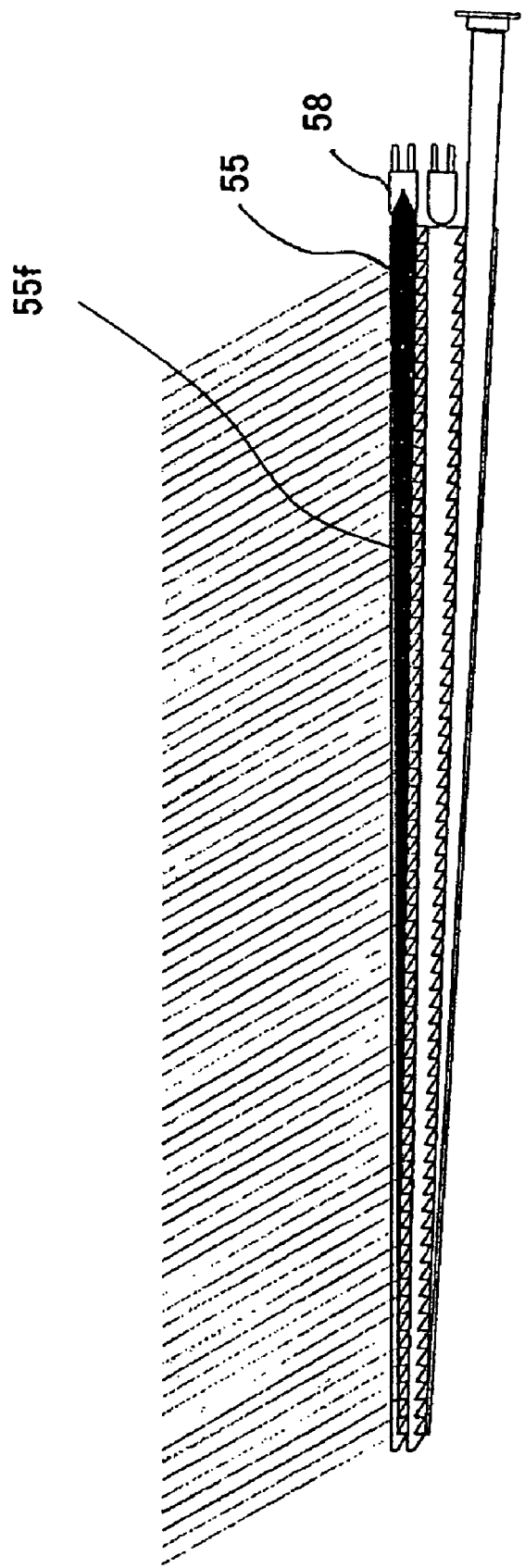
FIG. 27 shows a light ray tracing diagram added to FIG. 26.
Figure 28:
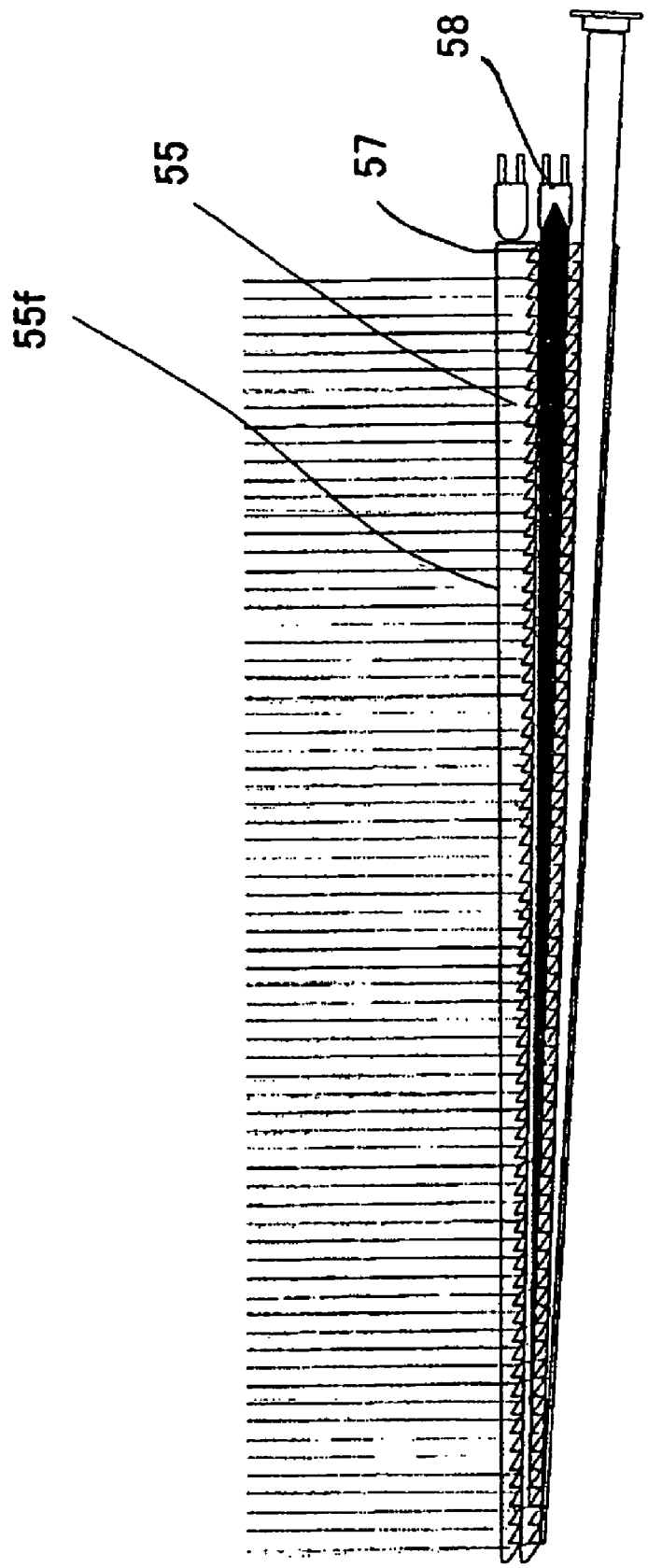
FIG. 28 shows a light ray tracing diagram added to FIG. 26.
Figure 29:
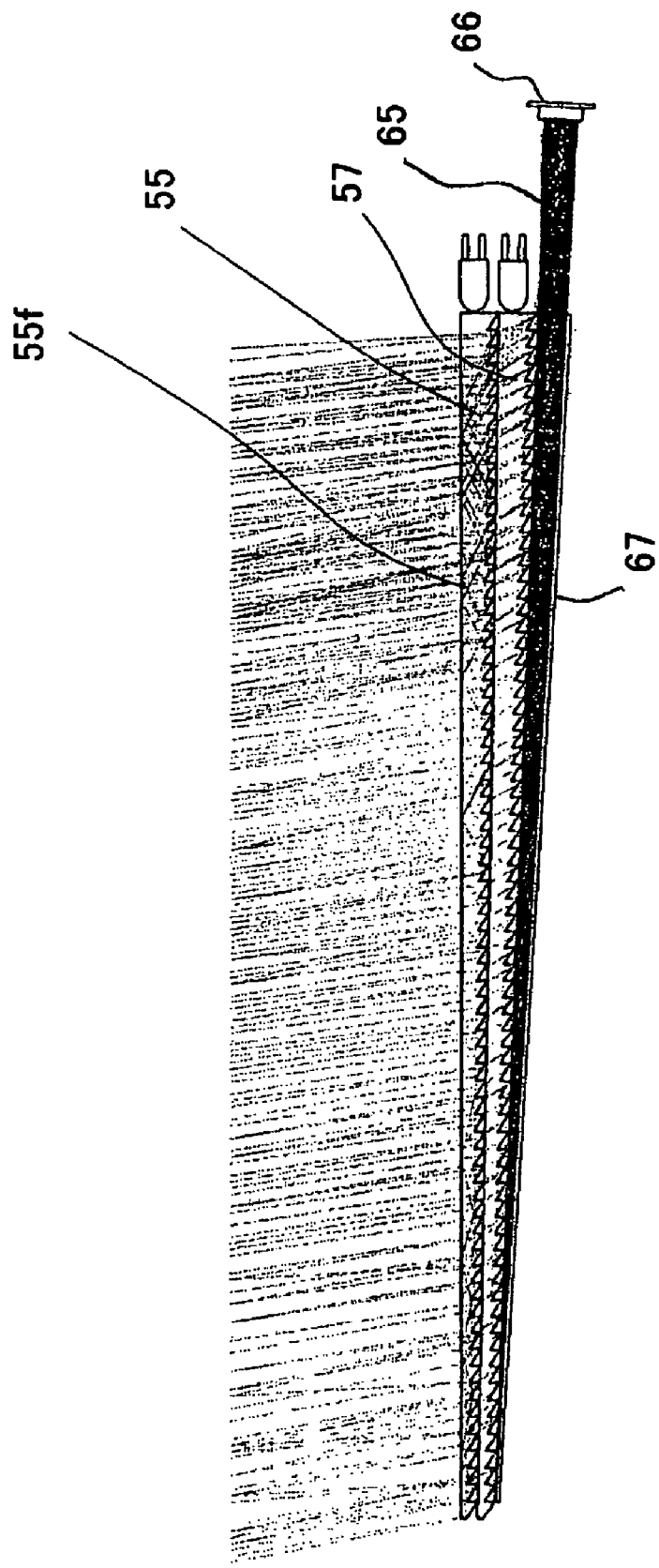
FIG. 29 shows a light ray tracing diagram added to FIG. 26.

FIG. 26 is a section view of a ring light optical system developed in the circumferential direction in the ring light-emitting device of Embodiment 5. FIG. 27 shows a light ray tracing diagram of luminous flux emitted from a first LED added to FIG. 26. FIG. 28 shows a light ray tracing diagram of luminous flux emitted from a second LED added to FIG. 26. FIG. 29 shows a light ray tracing diagram of luminous flux emitted from a third LED added to FIG. 26.

Embodiment 5 differs from Embodiment 4 in that the number of the LEDs is increased to three from two, and in association therewith, a light guiding member 65 and a reflecting member 67 corresponding to the light guiding member 22 and the reflecting member 23 used in Embodiment 1 are added.

Similarly to Embodiment 4, the ring light optical system of Embodiment 5 changes luminous fluxes emitted from a plurality of LEDs 56, 58, and 66 disposed within the video camera body to emerge from the same ring portion.

The first to third LEDs 56, 58, and 66 are arranged in this order from an object side to an image plane side near the image-taking lens barrel. The third LED 66 is of a surface mounting type including no condenser optical system and having a relatively high degree of diffusion. In other words, Embodiment 5 employs the third LED 66 having the characteristic in terms of light-gathering different from those of the first and second LEDs 56 and 58 and shows that light sources of different types or three or more light sources can be used in the present invention.

A first optical member 55, a second optical member 57, and the light guiding member 65, and the reflecting member 67 are arranged in this order from the object side to the image plane side around the image-taking lens barrel.

As described in Embodiment 4, luminous flux from the first LED 56 is incident on an entrance surface 55a of the first optical member 55 and is directed to a ring portion 55b of the first optical member 55. Luminous flux from the second LED 58 is incident on an entrance surface 57a of the second optical member 57 and is directed to a ring portion 57b of the second optical member 57. Luminous flux from the third LED 66 is incident on an entrance surface 65a of the light guiding member 65 and is directed to a ring portion 65b of the light guiding member 65.

Similarly to Embodiment 4, in Embodiment 5, the first optical member 55 and the second optical member 57 having the same shapes are arranged side by side, and the light guiding member 65 and the reflecting member 67 are disposed close to the back of the second optical member 57.

Description will hereinafter be made of the specific shape of the ring light optical system of Embodiment 5. As shown in FIGS. 27 and 28, the shapes of the first and second optical members 55 and 57 are identical to those described in Embodiment 4, and the optical effects of the optical members 55 and 57 on the luminous fluxes from the first and second LEDs 56 and 58 are also identical to those described in Embodiment 4.

As shown in FIG. 29, the luminous flux emitted from the third LED 66 is reflected within the light guiding member 65 or by the reflecting member 67, emerges from the light guiding member 65 generally along its emergence surface, and enters the second optical member 57 from prism edge surfaces 57e2 of micro prism portions 57e, as described in Embodiment 1. Then, the luminous flux is totally reflected by prism reflecting surfaces 57e1 of the micro prism portions 57e, emerges from the second optical member 57, and enters the first optical member 55 from prism reflecting surfaces 55e1 of micro prism portions 55e. The luminous flux is refracted by the prism reflecting surfaces 55e1 and emerges from an emergence surface 55f, similarly to the luminous flux emitted from the second LED 58 and entering the first optical member 55.

In this manner, in Embodiment 5, the two optical members 55 and 57 having the micro prism portions are arranged adjacently, and the light guiding member 65 and the reflecting member 67 are disposed close to the back thereof. The luminous fluxes from the three light sources are caused to emerge efficiently in ring shape with uniform light amount distribution by using the total reflection by the prism reflecting surfaces 55e1 and 57e1 of the first and second optical members 55 and 57 and the refraction by the prism reflecting surfaces 57e1 of the second optical member 57.

Embodiment 6

FIGS. 30 to 33 show a ring light-emitting device which is Embodiment 6 of the present invention and is disposed around an image-taking lens barrel of a digital camera contained in a cellular phone.

Figure 30:
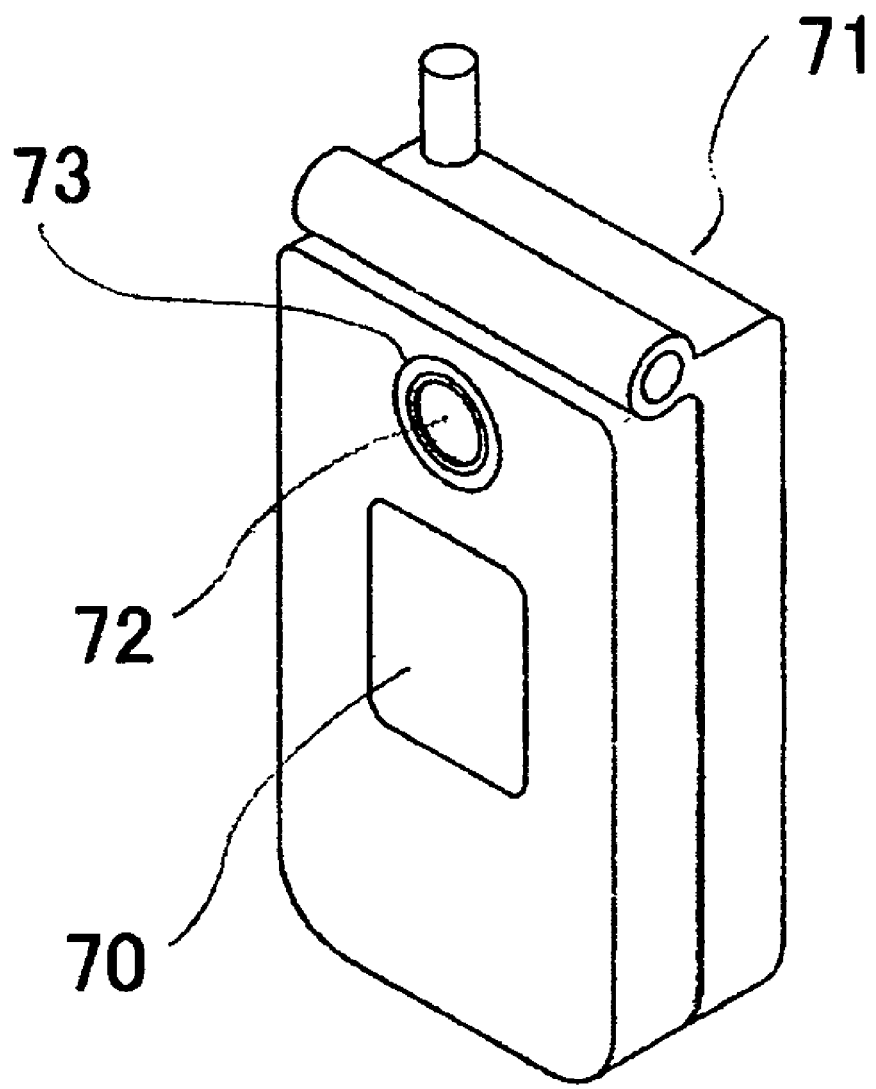
FIG. 30 is a perspective view showing a cellular phone which contains a ring light-emitting device which is Embodiment 6 of the present invention.
Figure 31:
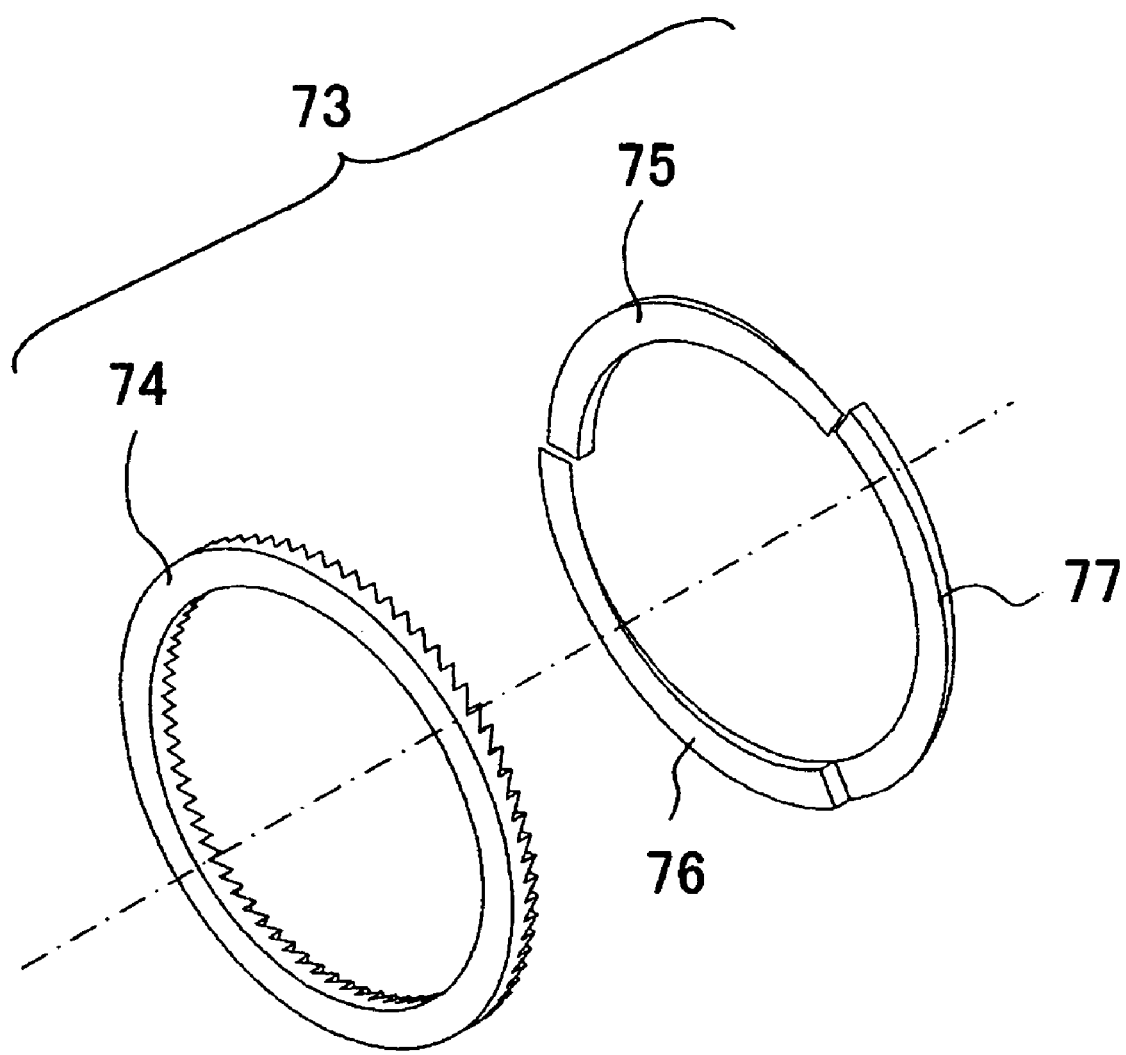
FIG. 31 is an exploded perspective view showing optical members which constitute the ring light-emitting device of Embodiment 6.
Figure 32:
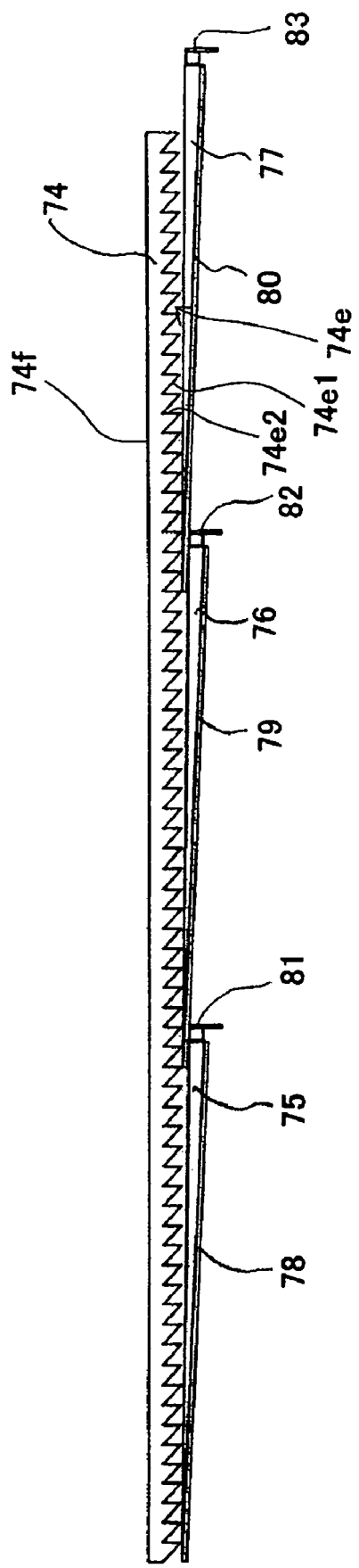
FIG. 32 is a section view showing a ring portion developed in the circumferential direction in the ring light-emitting device of Embodiment 6.
Figure 33:
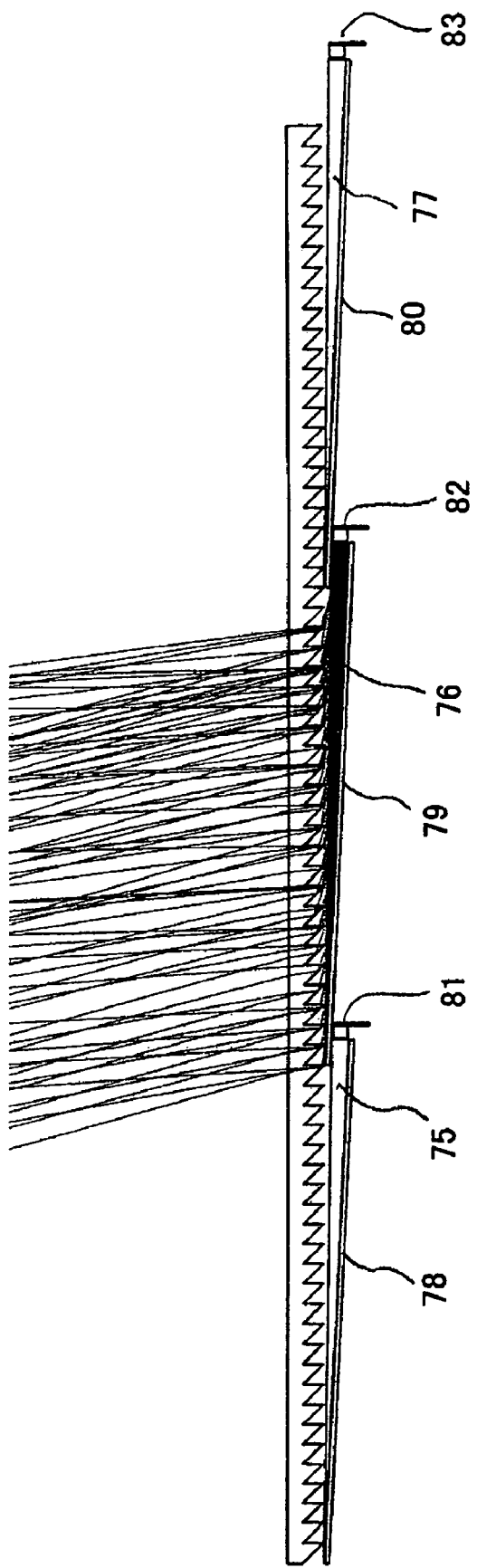
FIG. 33 shows a light ray tracing diagram added to FIG. 32.

FIG. 30 is a perspective view of the cellular phone in Embodiment 6. FIG. 31 is an exploded perspective view of optical members forming the ring light-emitting device contained in the cellular phone. FIG. 32 is a section view of a ring light optical system developed in the circumferential direction in the ring light-emitting device contained in the cellular phone. Fig. 33 shows a light ray tracing diagram of luminous flux emitted from an LED added to FIG. 32.

As shown in FIG. 30, the ring light-emitting device of Embodiment 6 is incorporated around the end portion of the image-taking lens barrel of the digital camera contained in the cellular phone. The ring light-emitting device changes luminous fluxes emitted from three LEDs placed within the cellular phone to emerge from the common (same) ring portion.

In FIG. 30, reference numeral 71 shows a cellular phone body, 72 the image-taking lens barrel of the digital camera, 73 the ring light-emitting device, and 70 a liquid crystal display of the cellular phone.

The ring light optical system of the ring light-emitting device 73 is formed of members shown in FIG. 31. Reference numeral 74 shows a ring-shaped optical member which is made of a transparent optical resin material. An emergence surface 74f of the optical member 74 is formed as a ring-shaped flat surface. A plurality of micro prism portions 74e are formed in the circumferential direction on the side opposite to the emergence surface 74f. Each of the micro prism portions 74e includes a prism reflecting surface 74e1 and a prism edge surface 74e2 formed between that surface 74e1 and the adjacent prism reflecting surface 74e1. All the prism reflecting surfaces 74e1 of the plurality of micro prism portions 74e are inclined on the same side. The optical member 74 has substantially the same thickness in an optical axis direction of emergence (an optical axis direction of the image-taking lens) around the entire circumference.

Reference numerals 75, 76, and 77 show light guiding members disposed in the circumferential direction at the back of the optical member 74. Each of the light guiding members is made of a transparent optical resin material and is formed to have a larger thickness closer to the light source and a smaller thickness with distance from the light source.

Reference numerals 78, 79, and 80 show reflecting members which are disposed at the back of the light guiding members 75, 76, and 77, respectively, and reflect luminous fluxes emerging to the rear of the light guiding members toward the front.

Reference numerals 81, 82, and 83 show the LEDs which are disposed near the end faces of the light guiding members 75, 76, and 77 in the circumferential direction, respectively, and are realized by small and highly diffusible light-emitting elements with no condenser lens in Embodiment 6.

In recent years, some of cellular phones have a function of display with illumination. For example, an operation status such as an incoming call is displayed in various colors provided by light sources such as LEDs with different colors. Also, many of new cellular phones contain digital cameras to take moving images and/or still images. A light-emitting device for illuminating an object is needed to support the taking of images with the digital camera, especially a light-emitting device for object illumination suitable for macro photography.

The cellular phone, however, is smaller than an image-taking apparatus such as a video camera, so that it is desirable to provide a light-emitting device serving both as an illumination apparatus and a display for the cellular phone.

Embodiment 6 shows the ring light-emitting device capable of both display and object illumination. Embodiment 6 not only allows display and illumination with a plurality of colors but also enables for macro photography with a ring-shaped emergence portion (hereinafter referred to as a ring portion).

Each of the LEDs used in Embodiment 6 contains three light illuminants (chips) for red, yellow, and blue, and can emit white light by simultaneous lighting of these chips. One or two of the three chips can selectively be turned on to emit light with a plurality of colors.

Embodiment 6 provides the ring light-emitting device using the three LEDs, in which the light guiding members 75, 76, and 77 as the arc shape formed by splitting the circumference into three guide light from the LEDs 81, 82, and 83 to three arc-shaped areas of the ring-shaped optical member 74. The three LEDs 81, 82, and 83 light or blink individually or light sequentially to perform various types of display based on the colors and lighting. Embodiment 6 can also be used as an illumination apparatus in taking still images or moving images in the digital camera by simultaneously lighting the three chips in each LED to emit white light.

Next, detailed description will be made of components which provide optical characteristics of the ring light-emitting device of Embodiment 6. As shown in FIG. 32, the optical member 74 has the emergence surface 74f and the plurality of micro prism portions 74e which are formed on the side opposite to the emergence surface 74f and are similar to those in Embodiments 1 to 5 described above. Embodiment 6 does not employ the structure as in Embodiments 1 to 5 in which the luminous flux from the light source directly enters the optical member and is totally reflected by the part of the micro prism portion at the foot thereof. Thus, the optical member 74 has the same thickness around the entire circumference. As a result, according to Embodiment 6, since the entire thickness of the ring light-emitting device can be extremely reduced, the device is optimal for mounting on a small electronic device such as a cellular phone.

The three light guiding members 75, 76, and 77 are arranged side by side in the circumferential direction at the back of the optical member 74 having such shape. The reflecting members 78, 79, and 80 associated with the three light guiding members 75, 76, and 77 are disposed at the back thereof, and the respective LEDs are placed near the end faces of the light guiding members in the circumferential direction.

The plurality of light guiding members and the plurality of LEDs in this manner allow the use of various types of display and the illumination of an object with sufficient brightness in taking images.

If the plurality of optical members are provided adjacently as in Embodiment 5, loss of light amount may be increased due to surface reflection when the luminous flux emerging from the rear optical member enters the front optical member. However, according to Embodiment 6, such loss of light amount can be reduced.

Next, the traveling of the luminous fluxes emitted from the LEDs will be described with reference to FIG. 33. FIG. 33 shows the light ray tracing diagram of the luminous flux emitted from the LED 82 at the center in the circumferential direction and entering the optical member 74 through the light guiding member 76, followed by emergence from the optical member 74.

The LED 82 used in Embodiment 6 has a wide irradiation angle range and emits luminous flux having components in various directions. The luminous flux is caused to enter the light guiding member 76 disposed close to the LED 82 without leakage. Thus, similarly to Embodiment 1, the luminous flux can be changed to emerge generally along the emergence surface of the light guiding member 76 with uniform light amount distribution over the entire emergence surface of the light guiding member 76.

The luminous flux emerging backward from the light guiding member 76 is reflected by the reflecting member 79, again enters the light guiding member 76, and emerges from the emergence surface.

As shown, almost no luminous flux emerges from the portion of the light guiding member 76 close to the LED 82. Thus, in Embodiment 6, the three light guiding members 75, 76, and 77 are arranged such that portions thereof overlap in the circumferential direction. Specifically, they are disposed such that a portion of each light guiding member close to the LED overlaps with a portion of the adjacent light guiding member away from the light source. This arrangement enables light to emerge from the entire optical member 74 with no lack when all the LEDs emit light.

With the ring light optical system formed as described above, the display colors or display positions can be set appropriately, thereby realizing various displays and object illumination depending on taking conditions.

For example, the LED 81 associated with the light guiding member 75 positioned above the image-taking lens barrel 72 instantaneously emits extremely bright light to perform object illumination for normal still image taking. The three LEDs 81, 82, and 83 can emit fixed white light with low intensity to perform object illumination suitable for macro photography of moving pictures. Display in various colors can be realized by using the light of red, yellow, and blue, and also by combining the light intensities of the respective colors at an arbitrary ratio. Changing the positions or the sequence of lighting can achieve more variable types of display. Since the ring light-emitting device of Embodiment 6 is contained at a conspicuous position close to the image-taking lens barrel, easily visible display can be provided.

While Embodiment 6 has been described with the use of the LEDs each including the chips for three colors as the light source, a single color LED or a white LED may be used instead. A lamp may be used as a light source.

While Embodiment 6 has been described with the use of the three LEDs and the three light guiding members, the number of the light sources and the light guiding members may be two, or four or more. While Embodiment 6 has been described with the case where the circumference is split into three generally equally in the circumferential direction, and the light guiding member and the light source are disposed in each of the three areas, the circumference may be split unequally. In this case, for example, the circumference may be split such that optimal illumination is performed whether the cellular phone (the digital camera) is positioned longitudinally or laterally in taking images, or in an arbitrary manner to provide display pleasant to the eye.

The plurality of light guiding members may be colored differently and the luminous flux from the light source (for example, a white LED) may enter the light guiding member associated with the necessary light color.

The ring light-emitting device having the same structure as that in Embodiment 6 can be mounted on various small apparatuses other than the cellular phone since the entire thickness can be reduced.

While Embodiment 6 has been described with the light-emitting device contained in the cellular phone, the light-emitting device may be formed for removable mounting on the cellular phone.

As described above, in Embodiments 1 to 6, one surface of the generally ring-shaped optical member made of the material which pass light is used as the emergence surface, and the opposite surface has the micro prism portions having the reflecting surfaces inclined on the same side. The luminous flux from the light source enters the direction changer and emerges from the emergence surface. This enables the luminous flux entering the optical member from the light source to be directed and gathered by the combination of refraction and total reflection without passing through a diffusion surface, so that the ring light optical system can be realized with excellent efficiency.

In other words, according to Embodiments 1 to 6, since the light form the light source is directed to the plurality of optical portions provided for the optical member from one side of the direction in which the plurality of optical positions are arranged, the light emission efficiency and light emission characteristics can be simply and accurately controlled mainly by the plurality of optical portions. Consequently, the light from the light source can be utilized efficiently and a desired light emission characteristic can be provided reliably. In addition, the device can be formed with a reduced thickness and a small number of parts.

The common optical member is used by the plurality of light sources and the plurality of optical portions in the optical member can mainly control the light emission efficiency and the light emission characteristic, so that the light rays from the plurality of light sources can be used efficiently and a desired light emission characteristic can be achieved easily. Since the light rays from the plurality of light sources emit from the common optical member, the light-emitting device can be used as a display means as well as an illumination means.

The luminous flux entering the ring portion of the optical member can emerge from the wide emergence surface with uniform light amount distribution through the direction changing effect and the condensing effect by the combination of total reflection and refraction.

The optical member can be formed with an extremely small thickness, and the light-emitting device can be mounted on a small electronic apparatus having the problem of limited space without increasing the size of the apparatus, thereby allowing design with high space efficiency.

The luminous fluxes from the plurality of light sources can emerge from the single ring-shaped emergence portion, and the emergence intensity or the light distribution characteristic can be arbitrarily adjusted depending on the position of the emergence surface. In this manner, the ring light optical system (the light-emitting device) can be realized with high flexibility of design.

The lamp, LED, xenon arc tube which emits flashlight can be used as the light source, and a combination thereof can be used. Thus, the types or the number of the light sources can be selected freely.

The light-emitting device of the present invention is not limited to Embodiments 1 to 6 described above, and various modes may be used without departing from the spirit or scope of the present invention, and Embodiments 1 to 6 may be realized with variations as appropriate. In other words, the present invention is not limited by the dimensions, materials, shapes, and arrangements of the components shown in Embodiments 1 to 6 described above.

For example, each of Embodiments 1 to 6 includes the plurality of micro prism portions formed continuously in the circumferential direction of the optical member, but the adjacent micro prism portions may have a certain interval between them. In other words, the plurality of micro prism portions may be formed intermittently as long as they are permitted in terms of the use efficiency of the light form the light source or the uniformity of the emerging light amount distribution.

This application claims a foreign priority benefit based on Japanese Patent Applications No. 2005-078094, filed on Mar. 17, 2005, which is hereby incorporated by reference herein in its entirety as if fully set forth herein.

What is claimed is:

1. A light-emitting device comprising:
an optical member which includes a first emergence surface and a plurality of optical portions, each of the optical portions including a first surface which directs light incident thereon from a first light source that is disposed on a first side of a direction in which the plurality of optical portions are arranged to the first emergence surfaces, and the plurality of first surfaces being inclined on the same side with respect to the first emergence surface; and a light guiding member which is disposed to extend along the plurality of optical portions, includes a second emergence surface, and directs light from a second light source that is disposed on the first side to the plurality of optical portions, the light from the second light source entering the plurality of optical portions through the second emergence surface;

the first emergence surface of the optical member and the second emergence surface of the light guiding member being formed in a ring shape wherein each of the optical portions includes a second surface formed between the first surfaces adjacent to each other, the first surface reflects light incident thereon through the second surface from the light guiding member and directs the reflected light to the first emergence surface, the second emergence surface of the light guiding member is overlapped with the plurality of optical portions of the optical member in a direction in which the light from the first and second light source emerges from the first emergence of the optical member, and the optical member and the light guiding member are configured such that the light from the first light source enters the optical member without passing through the light guiding member and the light from the second light source enters the light guiding member without passing through the optical member.

2. The light-emitting device according to claim 1, wherein the first surface refracts light incident thereon through the light guiding member to lead the light to the first emergence surface.

3. The light-emitting device according to claim 1, wherein the light guiding member is formed to have a smaller thickness from the first side to a second side opposite thereto in the direction in which the plurality of optical portions are arranged, the thickness being defined between the second emergence surface of the light guiding member and its surface opposite thereto.

4. The light-emitting device according to claim 1, wherein the optical member is formed to have a smaller thickness from the first side to a second side opposite thereto in the direction in which the plurality of optical portions are arranged, the thickness being defined between the first emergence surface of the optical member and its surface opposite thereto.

5. The light-emitting device according to claim 1, wherein the first emergence surface of the optical member is disposed around a lens of an image-taking apparatus.

6. An image-taking apparatus comprising the light-emitting device according to claim 1,
wherein the light-emitting device is formed to be removably mounted on or integral with the image-taking apparatus.

* * * * *